(12) United States Patent
Luca

(10) Patent No.: US 9,365,298 B2
(45) Date of Patent: *Jun. 14, 2016

(54) HIGH-SPEED AIRPLANE DEICING INSTALLATION SYSTEMS AND METHODS

(71) Applicant: Valentin Luca, Fairfield, CT (US)

(72) Inventor: Valentin Luca, Fairfield, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,087

(22) Filed: Apr. 17, 2015

(65) Prior Publication Data

US 2015/0298826 A1 Oct. 22, 2015

Related U.S. Application Data

(60) Provisional application No. 61/981,748, filed on Apr. 19, 2014.

(51) Int. Cl.
*B64F 5/00* (2006.01)

(52) U.S. Cl.
CPC .................... *B64F 5/0063* (2013.01)

(58) Field of Classification Search
CPC ............... B64F 5/18; B64F 5/54; B64F 5/63; B64F 5/72
See application file for complete search history.

(56) References Cited

U.S. PATENT DOCUMENTS

| | | |
|---|---|---|
| 3,460,177 A | 8/1969 | Rhinehart et al. |
| 3,533,395 A | 10/1970 | Yaste |
| 3,612,075 A | 10/1971 | Cook |
| 4,378,755 A | 4/1983 | Magnusson |
| 4,634,084 A | 1/1987 | Magnusson |
| 4,654,087 A * | 3/1987 | Fujita .................... B64F 5/0018 134/25.4 |
| 5,060,887 A | 10/1991 | Kean |
| 5,104,068 A | 4/1992 | Krilla et al. |
| 5,161,753 A | 11/1992 | Vice et al. |
| 5,354,014 A | 10/1994 | Anderson |
| 5,458,299 A | 10/1995 | Collins et al. |
| 6,038,781 A | 3/2000 | McElroy et al. |
| 6,092,765 A | 7/2000 | White |
| 6,820,841 B2 | 11/2004 | Mittereder et al. |

FOREIGN PATENT DOCUMENTS

WO  WO 01/92106  12/2001

OTHER PUBLICATIONS

U.S. Appl. No. 61/981,748, filed Apr. 19, 2014.

* cited by examiner

*Primary Examiner* — Tien Dinh
*Assistant Examiner* — Richard R Green
(74) *Attorney, Agent, or Firm* — McCarter & English, LLP

(57) ABSTRACT

The present disclosure provides an airplane ground deicing installation that minimizes the impact of deicing operations on the airport during icing conditions. The installation does not require alteration of a normal taxi pattern and can be performed as quickly as the average separation time between take-offs. The installation allows modification of its shape to adapt to the contour of almost all types of commercial passengers airplanes operating from major airports, and simultaneously deices large surfaces of the airplane. Deicing and anti-icing fluids are applied to airplane surfaces from nozzles positioned in close proximity to the airplane's surface. Speed and adaptability to different types of airplanes, combined with a design that allows rapid relocation of the installation, are key features that make it possible to place the installation on the taxiway, close to the head of the runway it serves, such that the taxi pattern and the separation in between takeoffs are not altered as compared to the normal operations of the airport.

20 Claims, 35 Drawing Sheets

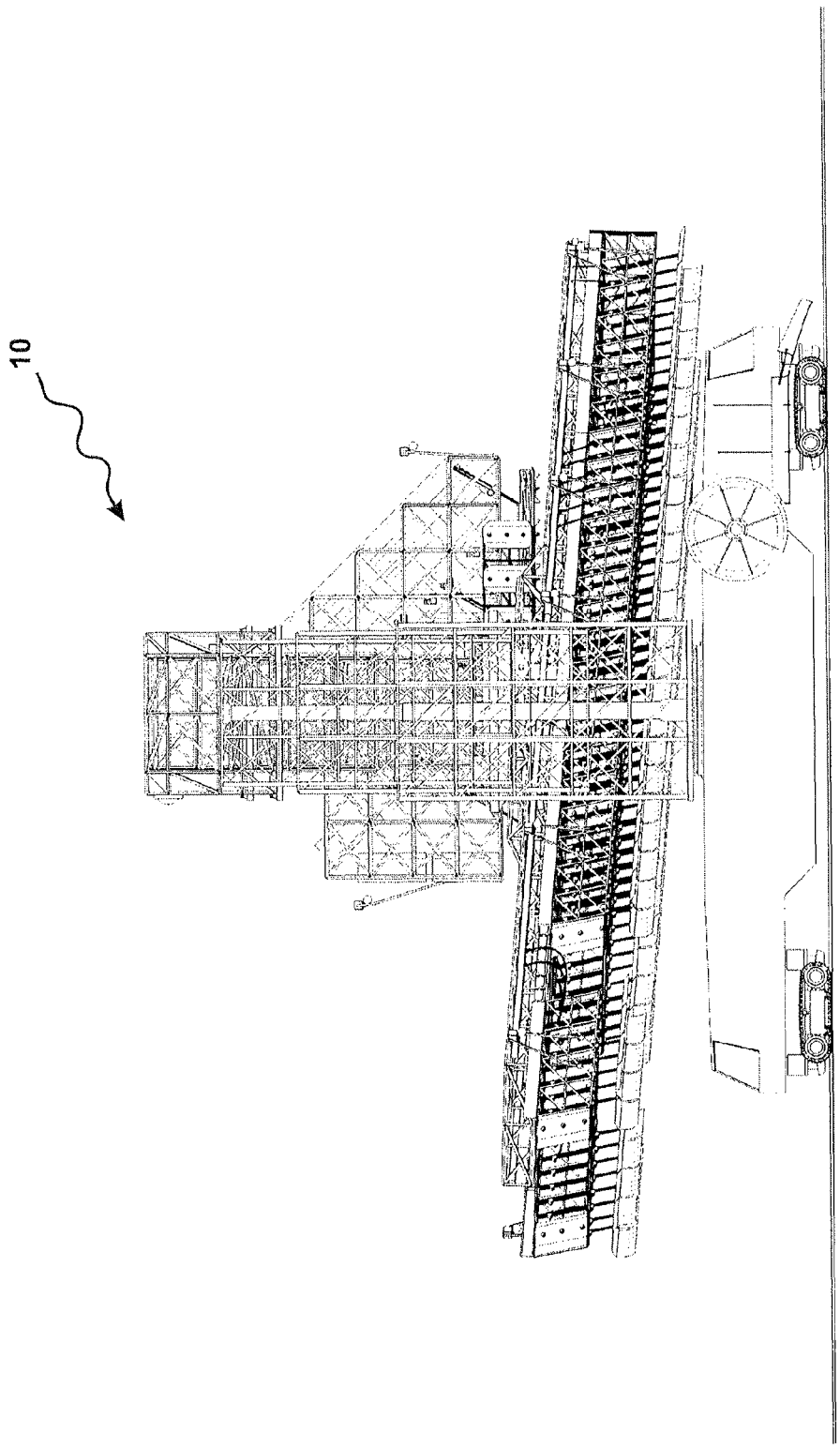

HIGH-SPEED AIRPLANE DEICING INSTALLATION SYSTEMS AND METHODS

CROSS-REFERENCE TO RELATED APPLICATION

The present application claims priority benefit to a provisional patent application entitled "High-Speed Airplane Deicing Installation," which was filed on Apr. 19, 2014, and assigned Ser. No. 61/981,748. The entire content of the foregoing provisional patent application is incorporated herein by reference.

BACKGROUND

1. Technical Field

The present disclosure relates to airplane ground deicing installation systems and methods and, more particularly, to deicing installation systems and methods that advantageously minimize the impact of an airplane's deicing treatment on the operation of an airport, e.g., during icing and/or snow conditions.

2. Background Art

Deicing of airplanes is a major contributor to winter-related air traffic delays. The ripple effect extends far beyond the weather-affected area, such that the costs to the airlines are in the order of billions of dollars each season, while the effect on the economy is much higher.

Currently available deicing technologies have been unable to eliminate the delays and associated issues related to airplane deicing operations. The overwhelming majority of the deicing operations are performed nowadays by deicing trucks that spray the airplanes' contaminated surfaces with deicing and anti-sticking fluids. The use of deicing trucks may derive from historical use of fire-fighting trucks to dispense glycol on glycol-cooled engines. Regardless of the genesis of deicing truck-based operations, the efficiency and efficacy of such operations are limited and in need of significant improvement.

According to conventional deicing operations, deicing fluids are heated and their concentration is controlled as a function of the type of frozen contamination and of the atmospheric conditions at the time of deicing. Sometimes air jets or heat radiators are also used to save deicing fluids that are not only expensive, but they have adverse environmental effects too.

Anti-sticking fluids are typically applied in a limited period of time after deicing, to prevent further precipitation to accumulate on the surfaces of deiced airplanes that cannot take off immediately after being deiced. The anti-sticking treatment is generally effective for a pre-determined period of time and, if that hold over time is exceeded, deicing must be repeated.

Delays are inherent in the use of deicing trucks simply because there is a limit on how many trucks can simultaneously work safely around an airplane. Deicing trucks also have an efficiency limitation as they apply the deicing fluids from a relatively large distance from the surface to be deiced.

There are at least three factors that can contribute to a deicing operation: a chemical factor, a thermal factor, and a mechanical factor. The efficiency of the last two effects diminishes rapidly as the distance from the dispenser to the surface to be deiced increases. Wind, a frequent factor on open spaces such as airport runways, is an aggravating factor that affects all aspects of truck-based deicing operations.

Applying fluids from shorter distance is not necessarily a solution for the deicing trucks since deicing will take even longer due to the need to traverse the perimeter of the airplane with the deicing truck(s) to apply deicing solution to all necessary surfaces.

Deicing time longer than the separation time in between take-offs requires that several airplanes are simultaneously deiced on several designated spots, off the taxiway, and this operational requirement entails longer taxi routes that translate into inconvenience, cost and even longer delays.

At major airports, numerous deicing trucks are needed in order to sustain the air traffic. The numerous deicing trucks around airplanes represent an additional hazard due to the potential for mishap, and their presence on the tarmac further increases the load/responsibility of ground traffic control personnel.

Numerous attempts have been made to improve airplane ground deicing operations. Prior attempts have been unsuccessful, however, as demonstrated by the fact that deicing truck-based operations are still the overwhelmingly-used airplane deicing technology.

The patent literature reveals additional efforts to improve the design and operation of airplane deicing operations. For example, the following patents/patent publications provide background teachings relative to the systems and methods of the present disclosure:

U.S. Pat. No. 3,533,395 to Yaste
U.S. Pat. No. 3,460,177 to Rhinehart et al.
U.S. Pat. No. 3,612,075 to Cook
U.S. Pat. No. 4,378,755 to Magnusson
U.S. Pat. No. 4,634,084 to Magnuson
U.S. Pat. No. 5,060,887 to Kean
U.S. Pat. No. 5,104,068 to Krilla et al.
U.S. Pat. No. 5,161,753 to Vice et al.
U.S. Pat. No. 5,354,014 to Anderson
U.S. Pat. No. 5,458,299 to Collins et al.
U.S. Pat. No. 6,038,781 to McElroy et al.
U.S. Pat. No. 6,092,765 to White
U.S. Pat. No. 6,820,841 to Mittereder et al.
WO 2001/092106 to Foster et al.

A summary of the difficulties and a general description of the most common pitfalls of the previous designs is provided herein. The noted pitfalls help to explain why none of the previous deicing installation designs aiming for high speed deicing have achieved general acceptance from the airlines and/or airports.

Airplane deicing is a complex process itself as the nature of the ice/snow contamination could widely vary subject to many weather-related factors, including precipitation type and quantity, temperature, relative humidity, wind direction and intensity. Operational factors also have a substantial impact on deicing operations, such as full or partially full tanks, after landing cold fuel, or "warm" after fueling up, parked position in respect to wind and the like.

However, it is not the complexity of the deicing process that is the main contributor to the failure of the previous attempts to build airplane ground deicing installations capable of deicing speeds such that to minimize the impact on airport operations during winter weather. The passenger airplanes operating from major airports are of large variety in size and shape, winglets representing a special challenge, and no prior attempt has succeeded in accommodating such a wide variety of airplane shapes/sizes/configuration while meeting all airports' and airlines' deicing requirements.

The majority of the installations intended to achieve high deicing speed and accommodate the largest airplanes have been fixed type installations entailing modified taxi patterns which entails delays and fuel burned to navigate to and from the installation.

Besides the inherent disadvantages resulting from a fixed type design, most designs for large installations require a precise, time consuming, positioning of the deiced aircraft relative to the source of deicing fluid, and have a low deicing fluid usage efficiency as a result of designs with substantial limitations to adapt to the different sizes, shapes, configurations and types of aircraft.

Some of the fixed installations have been hangar-type designs that improve the deicing speed and, up to a point, the deicing efficiency for larger airplanes. One particular hangar-type installation used heat radiation for deicing, eliminating the use of deicing fluids, but the deicing time was longer than the separation time between take-offs and therefore, several such installations would be needed to serve a busy airport where available terrain is an issue. Taxi pattern would also needed to be altered to accommodate such operations and airplanes deiced by this installation still required anti-sticking fluids.

Despite efforts to date, a need remains for high efficiency and high speed airplane deicing systems and methods that accommodate airplanes of different size, shape and configuration. Moreover, a need remains for deicing systems and methods that efficiently utilize deicing fluids despite environmental conditions, e.g., variable wind conditions, and that do not negatively impact other airport operations, e.g., timing between flight departures. Still further, a need remains for deicing systems and methods that demonstrate attention to the environment, most precisely to the recovery of deicing fluids. These and other objects are satisfied by the advantageous deicing systems and methods of the present disclosure.

SUMMARY OF THE INVENTION

The present disclosure provides high efficiency and high speed airplane deicing systems and methods with a wide scope of application that addresses airports' and airlines' deicing requirements. The disclosed deicing systems and method advantageously accommodate airplanes of different size, shape and configuration, thereby enhancing the operational efficiencies of a ground deicing installation.

The disclosed installation is designed to eliminate (or greatly reduce) deicing delays associated with conventional deicing operations at least in part based on the system's operational architecture that, even with a limited number of freedom degrees, contours as close in proximity to the airplane surfaces to be deiced as is safe for a full range of airplane-types that operate at major airports. This translates into high deicing efficiency and high deicing speed, which in the end offers the possibility of using normal taxi-pattern operations despite inclement weather conditions.

The disclosed installation adapts to an airplane that is stopped for deicing in an off-taxiway centerline and/or crabbing position to achieve desired deicing functionality.

The airplane deicing systems and methods also provide independently controlled proximity units that facilitate positioning of deicing nozzles relative to surfaces to be deiced. In exemplary implementations of the present disclosure, shielding means are provided in proximity to the deicing nozzles to control potential dissipation of deicing fluid to the surrounding environment, e.g., based on wind conditions. The proximity units further minimize the consumption of deicing fluids and heat energy by providing a platform for the deicing nozzles. The disclosed platform(s) are designed and actuated such that they can safely come into close proximity to the surface of the airplane while the shielding means advantageously preserve the thermal and mechanical energy of the deicing fluids jets and maintain for a longer duration the warm boundary formed by the deicing fluid on the deiced surface.

Flight safety is also improved by reducing the potential for human error factor, e.g., forgotten surfaces on an airplane or spraying the wrong areas, and by performing the de-icing just prior to an airplane take-off.

Airport safety is improved by eliminating the traffic of deicing trucks on the tarmac, by reducing the load on the radio frequencies of the ground/deicing control operation and generally by reducing the stress level caused by delays and work overload.

The disclosed airplane deicing systems and methods are ecofriendly in several ways, including based on the high deicing efficiency achieved according to the disclosed design/method and a reduction in jet fuel burn associated with deicing operations. Additionally, the enhanced deicing speed associated with the disclosed systems/methods reduces the dilution of run-over deicing fluids, thereby reducing the energy consumed for recycling of deicing fluids.

Advantageously, the use of anti-sticking fluids may be completely eliminated according to the present disclosure as the disclosed deicing systems and methods are designed to be operated close to the head of the runway and the deicing can be synchronized with take-offs so as to reduce and/or eliminate the hold-over time.

The disclosed installation is relocatable and the disclosed mobility means allow a rapid deployment from one location to another if traffic conditions require so. The possibility to rapidly relocate the installation not only allows the use of the installation on a taxiway, but it minimizes an airport's investment in such installations and on tarmac infrastructure since it requires just one deicing location close to the head of each runway instead of the many deicing pads required to accommodate the use of deicing tracks. The disclosed installation is generally designed to run mostly electrically, although alternative powering systems may be implemented in whole or in part.

In exemplary embodiments of the disclosed deicing installation, ground deicing-related delays are eliminated (or substantially eliminated) while minimizing the impact on airport operations mainly by:
  i) Reducing the average duration of deicing to the level of the average separation time between take-offs, eliminating deicing-caused delays; and
  ii) Using the usual taxi pattern since the disclosed installation is able to deice practically all types of airplanes operating on major airports and it is relocatable, as needed.

The disclosed deicing installation is intended to be placed as close as practical and allowed by regulations to the head of served runway, preferably on the taxiway. During the deicing process, the airplane is stopped at a designated point, preferably on the taxiway, and the disclosed installation moves along the airplane, eventually reversing direction if needed, while deicing and anti-icing fluids and eventually air jets are being dispensed from nozzles appropriately located on the different structures associated with the disclosed system. A key speed-enabling feature of the installation is its architecture that allows the simultaneous deicing of large surfaces of the deiced airplane.

Another key feature of the installation is the high deicing efficiency which is another speed-enabling factor. Increased efficiency is achieved by applying the deicing and anti-icing fluids, air jets and heat and the like, from as close as safe distance from airplane's contaminated surfaces. The architecture of the disclosed installation, even with a limited number of freedom degrees, allows structural members to change their relative position such that they get as close as safe to the contour of practically any airplane operating from major airports. These structural contouring members of the installation form a platform for deicing systems used to apply the deicing means from relatively short distance to the surface of the airplane.

In exemplary embodiments of the present disclosure, independently controlled proximity units are provided. The proximity units are collectively referred to herein as the proximity structure. The proximity structure further minimizes the consumption of deicing fluids, heat and mechanical energy by providing a platform for the deicing means that get even closer to the surface of the airplane without affecting safety.

The independently controlled proximity units are generally fabricated using lightweight, frangible materials. They may be equipped with proximity sensors and actuators that ensure/enhance operational safety and control the proximity to the surface of the airplane.

In further exemplary embodiments, the disclosed deicing systems include shield devices that are designed to save deicing fluids and preserve the thermal and mechanical energy of the deicing fluid jets. The shield devices further maintain for a longer duration the warm boundary formed by the deicing fluid on the deiced surface.

Another feature of exemplary implementations of the disclosed installation that contributes to increased efficiency, saves fluids and reduces deicing time, is automation of the deicing process that is facilitated by the disclosed system to enhance/optimize the deicing jets and by spraying "on condition". "On-condition" spraying is achieved by monitoring the process by operators and/or by ice detection sensors, such that the nozzles spray only when positioned above a surface and they are switched off as soon as frozen contaminants are removed from that surface.

In use, exemplary embodiments of the disclosed high efficiency and high speed airplane deicing systems and methods are generally designed and operate as follows. The airplane to be deiced stops at a designated place and the disclosed installation moves all the way from the airplane's nose to its tail, eventually reversing direction, while the structural contouring members, as controlled by actuators, adapt their position to the contour of the airplane in correlation with the movement of the installation and the position of the deiced airplane.

The movement along the airplane and back to the home position from where a new deicing cycle starts again is generally performed by two mobility units, one on each side of the airplane. The mobility units also provide the means to redeploy the installation to another location if air traffic conditions change. The steering system associated with the mobility units enables their relocation with minimum disruption to an airport's operations.

The backbone of the disclosed installation is a horizontal structural beam that is supported on each side by two telescopic vertical poles, each pole being attached to a mobility unit by bearing means that allow the pole to rotate against its vertical axis.

At a location that is generally about the middle of the horizontal structural beam there are installed contouring members that form the platform for deicing the top of the fuselage and the vertical fin and at least part of the horizontal stabilizer of the deiced airplane.

There are two (left and right) vertical fin structures extending downwards, left-right, that are slidably attached to the horizontal structural beam and leaving a clearance in between. On each vertical fin structure a vertical fin extension may be movably mounted that is slidable up-down as needed to adapt to large fins.

The position of the elements of the vertical fin structures in coordination with height of the vertical poles are controlled by actuators to adapt to the vertical fin size and to the heights of the fuselage and horizontal stabilizer of the deiced airplane.

Two telescopic downward vertical structures are generally slidably mounted with respect to the horizontal structural beam. The telescopic vertical structures are generally positioned inboard-outboard. Between the telescopic vertical poles and the vertical fin structures there are provided an elongated structural beam, hereinafter "over-wing beam" or "over-wing structure," that is attached to each downward vertical structure by means that allow the over-wing structures to be rotated by actuator means in horizontal and in vertical planes to correlate with the swept and with the dihedral angles of the wing of the deiced airplane while the height of the over-wing structures, in correlation with the position of the other structural contouring members is adjusted by the actuators that control the height of the telescopic_downward vertical structures.

Along the length of the over-wing structures are slidably installed a plurality of modules, extending downward and having a height about the same as the tallest winglets of the deiced airplanes. In correlation with the position of the other structural contouring members, actuators slide a number of modules outward for a distance forming a passageway in between the inboard and the outboard modules, wide enough to allow the installation to safely clear the winglets of the deiced airplane while the lower side of the modules pass in close, but safe, proximity over the upper surface of the wing when the installation moves along the airplane. The over-wing beam and the modules form the platform for deicing the wings, winglets, the side of the fuselage and the horizontal stabilizers.

Flight safety and airport safety are improved in many respects by the disclosed installations and methods of use, including by reducing the human error factor, by reducing the traffic of the deicing vehicles on the airport and by reducing personnel's stress caused by delays and work overload. The high speed and high efficiency of the disclosed systems and methods result in important deicing-related savings for airlines by reducing deicing-related delays and idle fuel burn, by a more efficient use of the deicing fluids and by reducing the labor involved in deicing. To the environment's benefit, besides the more efficient use of deicing fluid, the disclosed installation reduces the costs of recovery of the deicing fluids, by reducing the dilution of the run over fluids and by reducing the number of deicing pads necessary to deice the same number of airplanes per unit of time.

Additional features, functions and benefits of the disclosed high efficiency and high speed airplane deicing systems and methods will be apparent from the detailed description which follows, particularly when read in conjunction with the appended figures.

BRIEF DESCRIPTION OF THE DRAWINGS

To assist those of skill in the art in making and using the disclosed high efficiency and high speed airplane deicing systems and methods, reference is made to the accompanying figures, wherein:

FIG. 1e is a side view of an exemplary deicing installation according to the present disclosure;

DESCRIPTION OF EXEMPLARY EMBODIMENT(S)

As noted above, the present disclosure provides high efficiency and high speed airplane deicing systems and methods with a wide scope of application that addresses airports' and airlines' deicing requirements. The disclosed deicing systems and method advantageously accommodate airplanes of different size, shape and configuration, thereby enhancing the operational efficiencies of a ground deicing installation.

The disclosed installation is designed to perform airplane ground deicing on a taxiway as close as practical and permitted by regulations to the head of the runway it serves. Of course, the disclosed installation could be installed on a diversion of the main taxiway or on a special pad, depending on the particularities of an airport and of the preference of an airport's operator. In the description hereinafter, all of these deployment alternatives will be generically referred as taxiway-based installations.

There are two key features that allow the disclosed installation to operate effectively on a taxiway: (i) deicing speed that can match the average separation time between take-offs, and (ii) the adaptability of the disclosed installation to most of the passenger airplanes operating from major airports.

Figure 1A:
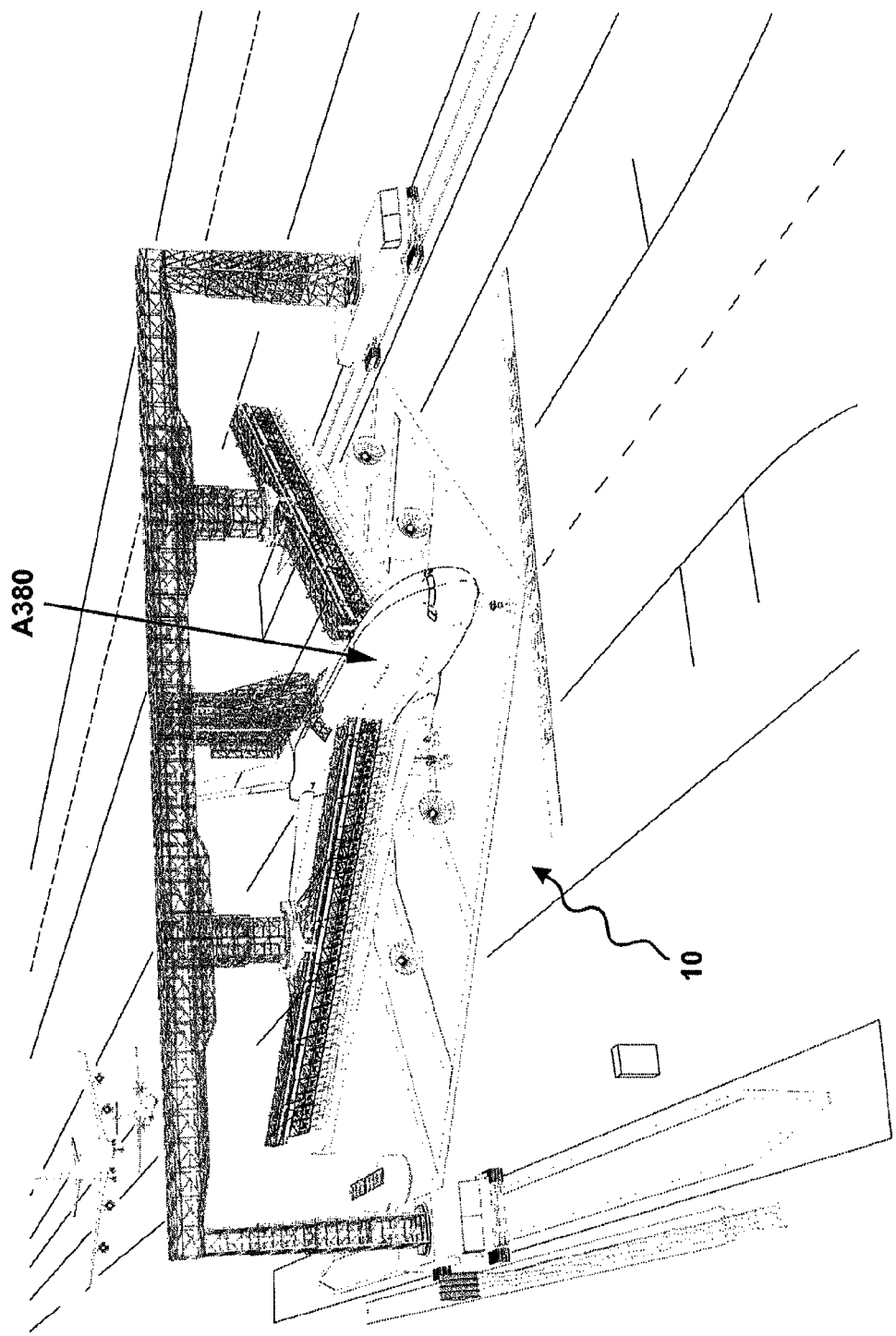
FIG. 1a is a front perspective view of an exemplary deicing installation according to the present disclosure with an A380 airplane (one of the largest passenger airplanes) positioned in a deicing location.
Figure 1B:
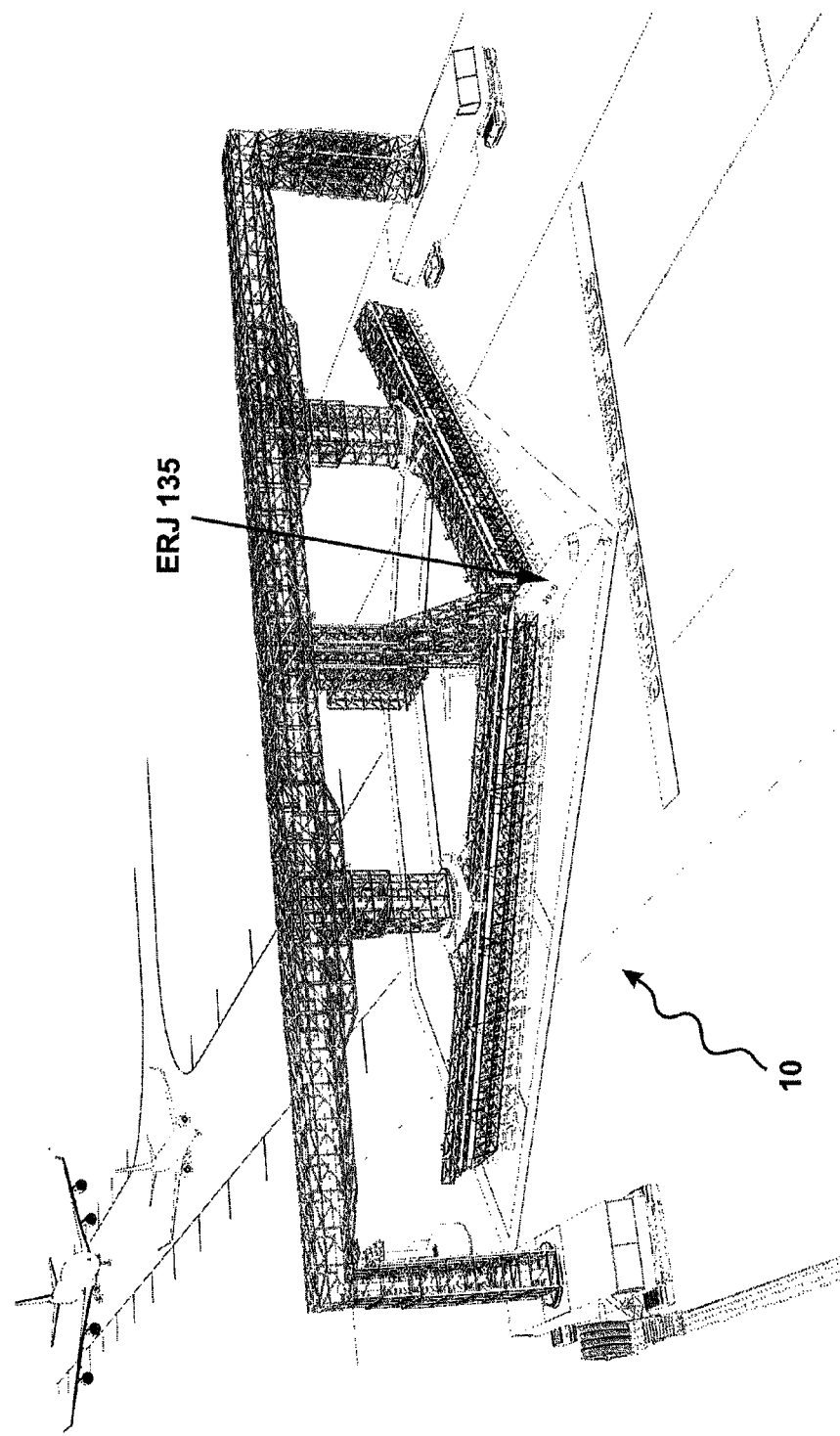
FIG. 1b a front perspective view of an exemplary deicing installation according to the present disclosure with an ERJ135 airplane (one of the smallest passenger airplanes) positioned in a deicing location.

Referring to the drawings, FIG. 1a shows an exemplary embodiment of the disclosed deicing installation 10 in a configuration for deicing of the largest passenger airplane, the Airbus 380, while FIG. 1b shows the disclosed deicing installation 10 in a configuration for deicing of one of the smallest airplanes operating from major airports, the Embraer ERJ-135. In both FIGS. 1a and 1b, the installation is shown in a deicing position relative to the wings of the noted aircraft.

Figure 1C:
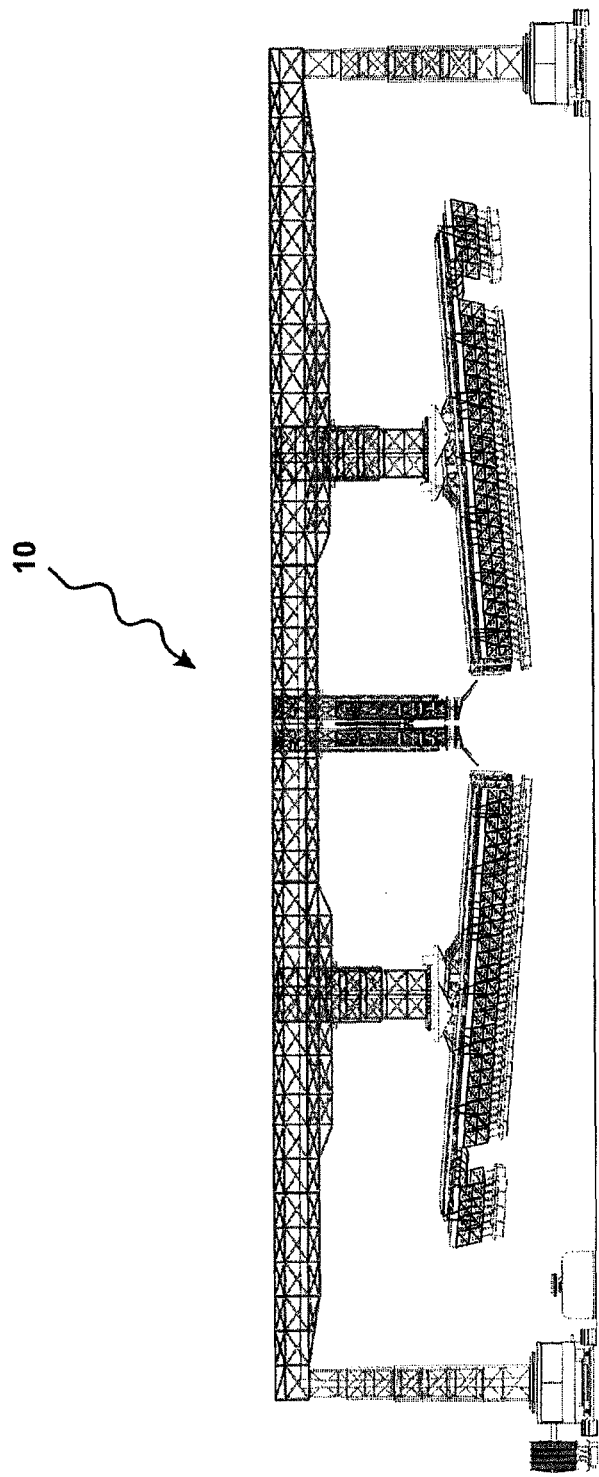
FIG. 1c is a front view of an exemplary deicing installation according to the present disclosure.
Figure 1D:
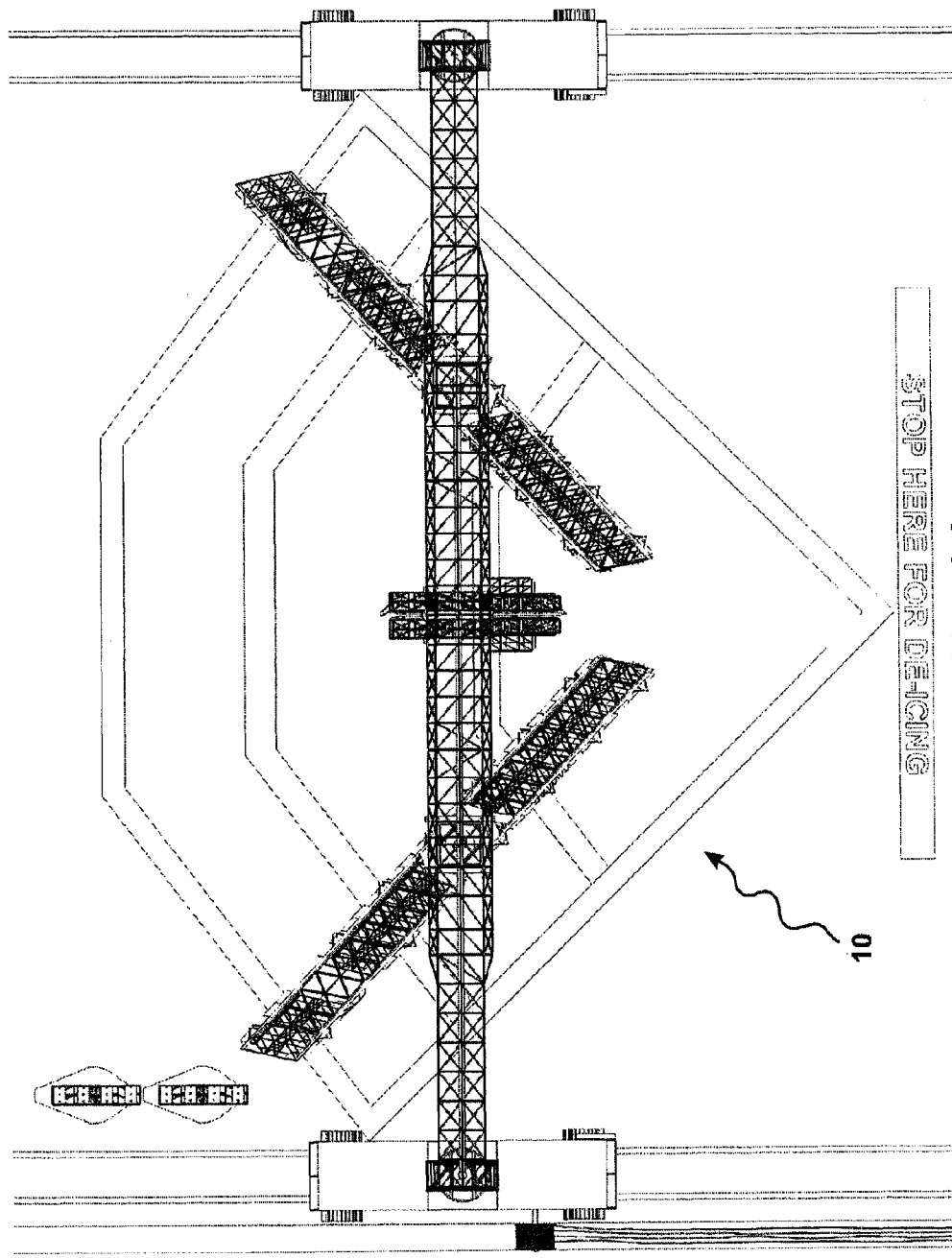
FIG. 1d is a top view of an exemplary deicing installation according to the present disclosure.

Orthogonal views of the deicing installation 10 are shown in FIG. 1c (front view), FIG. 1d (top view), and FIG. 1e (right side view).

The disclosed installation 10 can advantageously open up to give free passage to airplanes not compatible with the installation or not yet programmed in the numerical control of the installation. However, as noted above, the disclosed installation 10 is designed to provide deicing functionality with respect to the vast majority of airplanes currently operating in the passenger airline industry. Of note, when airplane type are referenced herein, it is generally the tail number that is considered in configuring the installation 10 for deicing operation. During their lives, some airplanes are modified in ways that impact the exterior geometry/configuration, e.g., winglets and/or antenna may be added or modified.

Figure 2A:
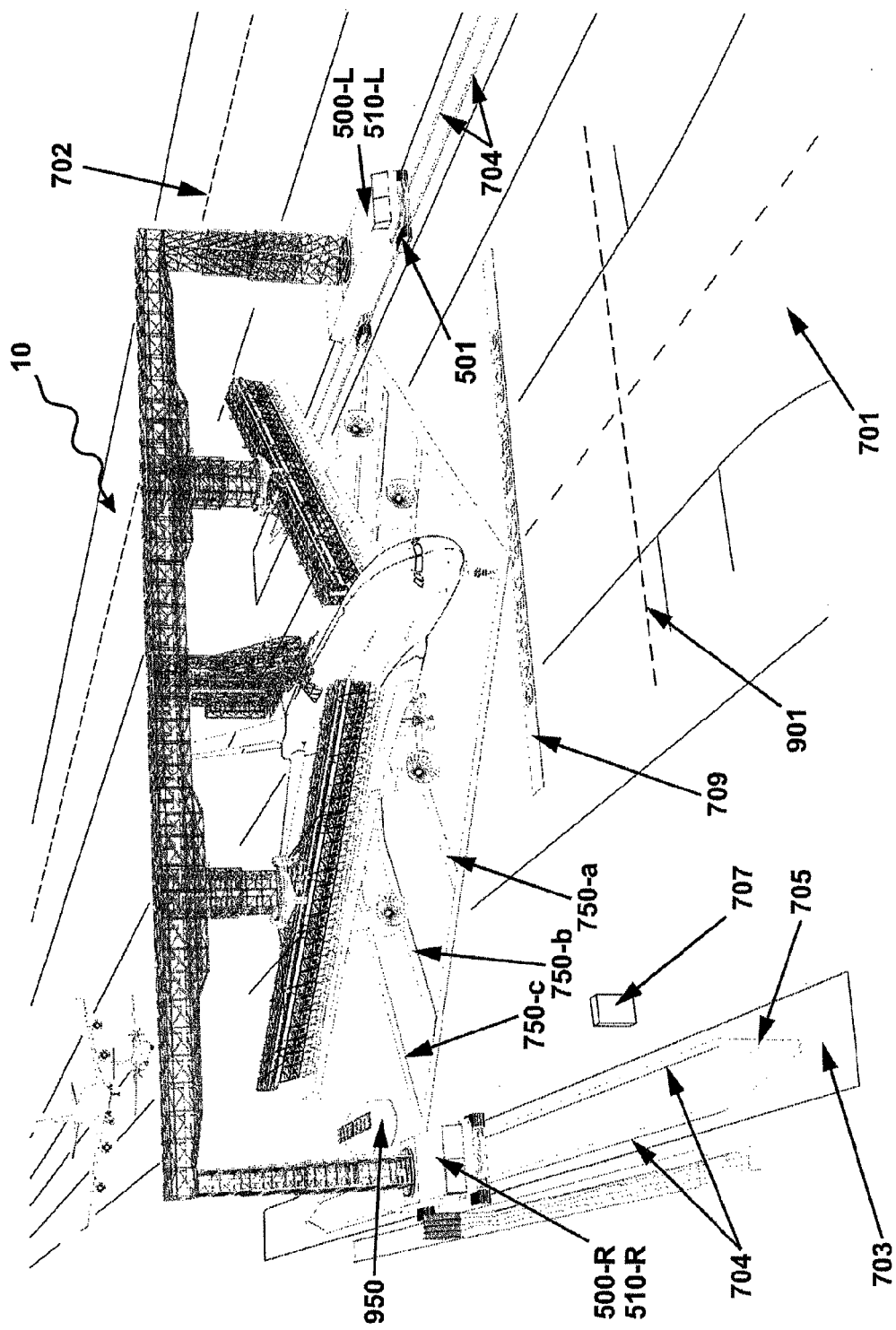
FIG. 2a is a further front perspective view of an exemplary deicing installation according to the present disclosure.

FIG. 2a shows a schematic view of exemplary deicing installation 10 riding on steel rails during deicing operation mode. The airplane is shown in a recommended/target deicing location, on a taxiway 701 close to the entrance of the active runway 702, and the deicing installation 10 is shown at a moment when it deices the wings and mid-portion of the top fuselage.

The disclosed installation can adapt to airplanes that are off centerline and/or in crab position, as described hereinafter. Any position of an airplane for which the deicing functionality can be safely performed by the described installation is referred hereinafter as an "acceptable position," regardless of whether the airplane is located on the centerline and/or is parallel to or angled with respect to such centerline.

In exemplary implementations of the disclosed system/method, the taxiway is provided with passive and active, automatic, guidance signage to help the flight crew to position the airplane for deicing. The disclosed deicing installation is typically provided with radio means to communicate with the flight crew. Provisions for data transfer between the deicing installation and the airplane is also recommended.

FIG. 2a shows line/marking 709 which functions as an aid to the pilot in positioning the airplane at a desired stop/deicing location. The structures 707 represent the deicing installation-airplane visual communication panel. At a minimum, structures 707 generally display instructive messages, such as "Stop at red line for deicing", "Com:XXX.XXX MHz" and "Deicing complete—move," or the like. Additionally, the structure may also include/communicate messaging such as: "XX % of deicing complete" while deicing work is in progress, and "YY gallons used," "ZZ minutes duration," "Have a good flight," or the like at the end of the deicing operation.

Referring to the orientation of the installation, hereinafter the center-surface is also referred to as the installation centerline, is the symmetry plane of an airplane positioned in the ideal position, parallel with, and on the centerline of the taxiway with the nose where indicated and "left" and "right" correspond, respectively, to the port and starboard sides of the airplane being deiced. "Front" and "back" correspond, respectively, to the front and tail of the airplane being deiced. "Inboard" and "outboard" correspond, respectively, to towards and away from the installation centerline or the airplane being deiced.

The deicing installation 10 generally rides on its two mobility units 500-L, 500-R. At least one of the mobility units 500 may include extra-space, e.g., a cabin-like structure, that functions to house operator(s) and several systems of the deicing installation as described hereinafter. In exemplary embodiments, both mobility units are built with and integrated with such cabin-like structures 510-L, 510-R The mobility units typically have two modes of operation:
i) Deicing mode. The mobility units move the deicing installation along the airplane during the deicing process and return it to the home position. At any given moment, any change in the relative position of the structural contouring members described hereinafter are controlled according to the positions of the installation and of the deiced airplane.
ii) Relocation mode. The installation is relocated from one service point to another, e.g., if the air traffic conditions change or if it is moved to a parking location for the periods when deicing services are not needed.

In deicing mode, the mobility units typically ride either:
a) on metal rails. The exemplary embodiment in FIG. 2a shows one pair of rails 704 installed on each side along the designated deicing area of the taxiway. Single rails could be also used. In this embodiment the mobility units are also provided with metal wheels that are used only during the deicing operation mode when riding on steel rails.
b) on tarmac using the same crawlers or wheels that are used for relocation.

The disclosed deicing system/method may be effectively implemented with either of the deicing mobility embodiments, i.e., an embodiment that rides on steel rails or an embodiment that rides on the tarmac (or a combination thereof), and it may be a matter of an airport operator's preference as to which of the mobility modalities is selected/used.

An installation riding on steel rails is generally less sensitive to the influence of ice/snow on the taxiway, but in such implementation the airport is required to provide the steel rails. From the deicing installation point of view, the metal rails generally require wider clearances to the airplane and more complicated programming to accommodate for an airplane in a crab position. Wider clearances to the airplane may result in lower deicing efficiency.

Use of the relocation crawlers or wheels in the deicing mode requires keeping the deicing area clean of ice, but based on the extreme maneuverability of the mobility means disclosed by the present invention, the installation could perfectly align with an off-centerline, and/or crab position airplane and this advantageously translates to reduced clearances and hence increased deicing speed and efficiency.

A preferred embodiment of the present disclosure involves use of the tarmac at least in part because such operation has the additional advantages of lower investment and faster redeployment.

In embodiments that include steel rails, the steel rails 704 are generally installed on concrete pads 703 and the length of the steel rails 704 is selected so as to enable the deicing installation to serve the largest airplanes operating from that particular airport.

The mobility units 500 may be provided either with crawlers or rubber-type wheels. Crawlers 501 are the preferred embodiment for reduced ground pressure during relocation such that, if needed, unpaved ground could be used for relocation in order to minimize disruptions of the airport operations.

Figure 2B:
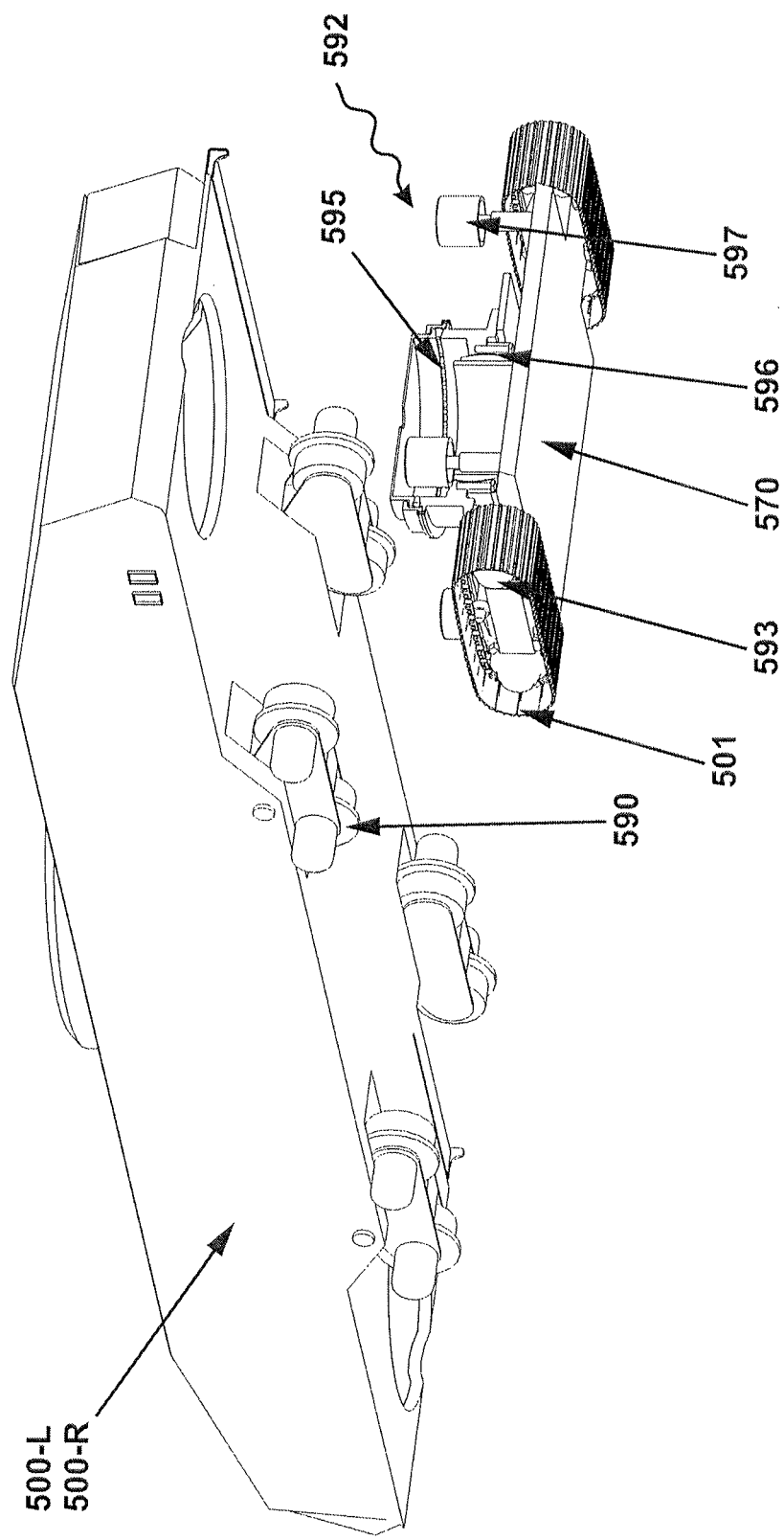
FIG. 2b is an exploded perspective view of an exemplary mobility unit according to the present disclosure.

FIG. 2b is a detail exploded view of mobility units 500 showing the steel wheels 590 and one crawler unit 570. The suspension 592 is generally of a type that maintains the correct position of the installation 10 and ensures its integrity. It includes a spherical sliding attachment 596 attached to the mobility means though bearing means 595 that allows the crawler unit to rotate against an essential vertical axis, while the suspension active shock absorbers 597 maintain the mobility unit in a position that does not result in overloads in the structure of the deicing installation.

According to the present disclosure, two exemplary construction alternatives for transferring from the crawlers or wheels 501 to the steel rails 704 are noted. The first "passive" system requires aligning the steel wheels 590 (not visible in FIG. 2a) provided on the mobility units 500 with the steel rails. Side sliding of steel wheels 590 and special steel rail geometry 705 (FIG. 2a) may facilitate the alignment. In the "passive" system, after the alignment, the installation 10 continues to move against an upslope portion of the rails such that the weight of the installation is gradually transferred from the relocation crawlers or wheels 501 to the steel wheels (not shown). In a second "active" system, after alignment, the steel wheels 590 could be lowered and pushed against the rails 704 until the crawlers 501 are raised.

In an alternate embodiment, the suspension 592 shown in FIG. 2b raises the crawlers 501 and the mobility until units 500 ride only on the steel rails 704 (not shown in FIG. 2b).

Figure 2C:
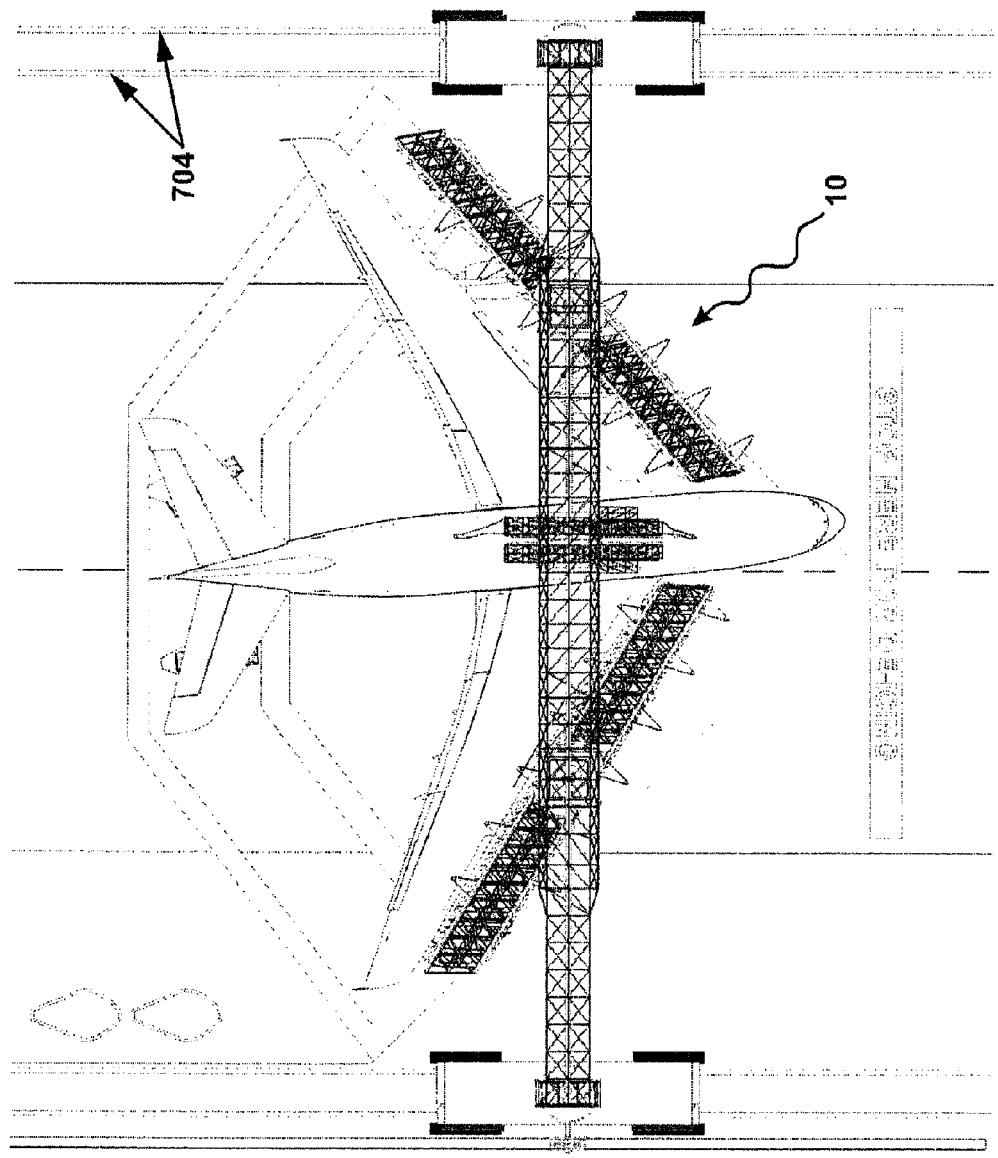
FIG. 2c is a further top view of an exemplary deicing installation according to the present disclosure.

FIG. 2c is a top view of the installation 10 shown riding on steel rails 704 while deicing a crabbed, off-centerline airplane (A380 shown). Of note, a typical asymmetric relative position between the airplane and the installation 10 is illustrated in FIG. 2c. In this case, larger clearances are required in between the installation and the airplane, especially for the vertical fin.

Figure 2D:
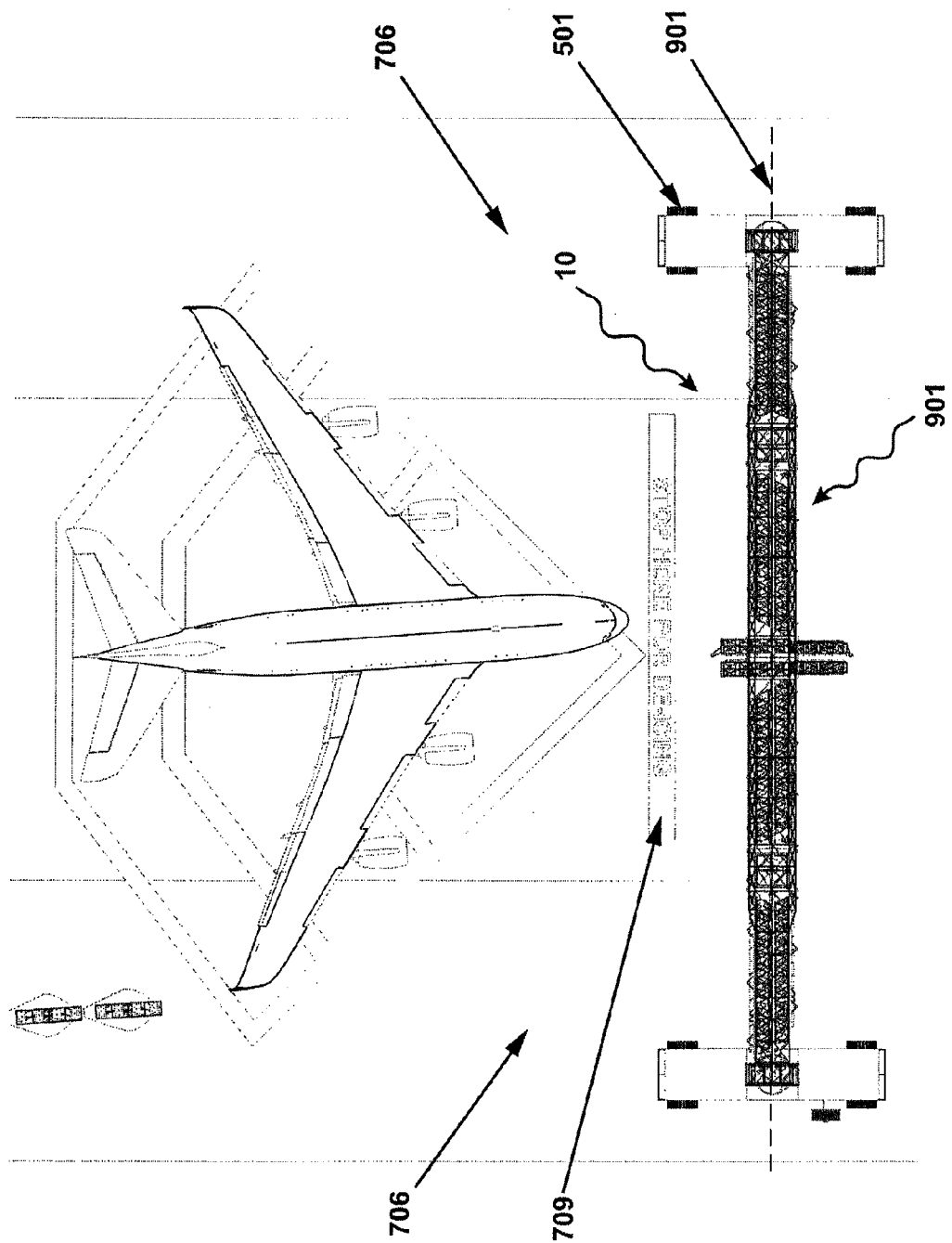
FIG. 2d is a top view of an exemplary deicing installation according to the present disclosure that has not yet been moved into a deicing position relative to an aircraft.

FIG. 2d is a top view of an exemplary embodiment in which the mobility units 500 ride on tarmac on the same crawlers 501 that are used for relocation. The tarmac deicing location 706 is as wide and as long as required to deice the largest airplanes operating from that particular airport (A380 shown). The airplane is close to the indicated "stop" position" line 709 while the installation 10 is shown in the home position 901 (also shown in FIG. 2a).

Figure 2E:
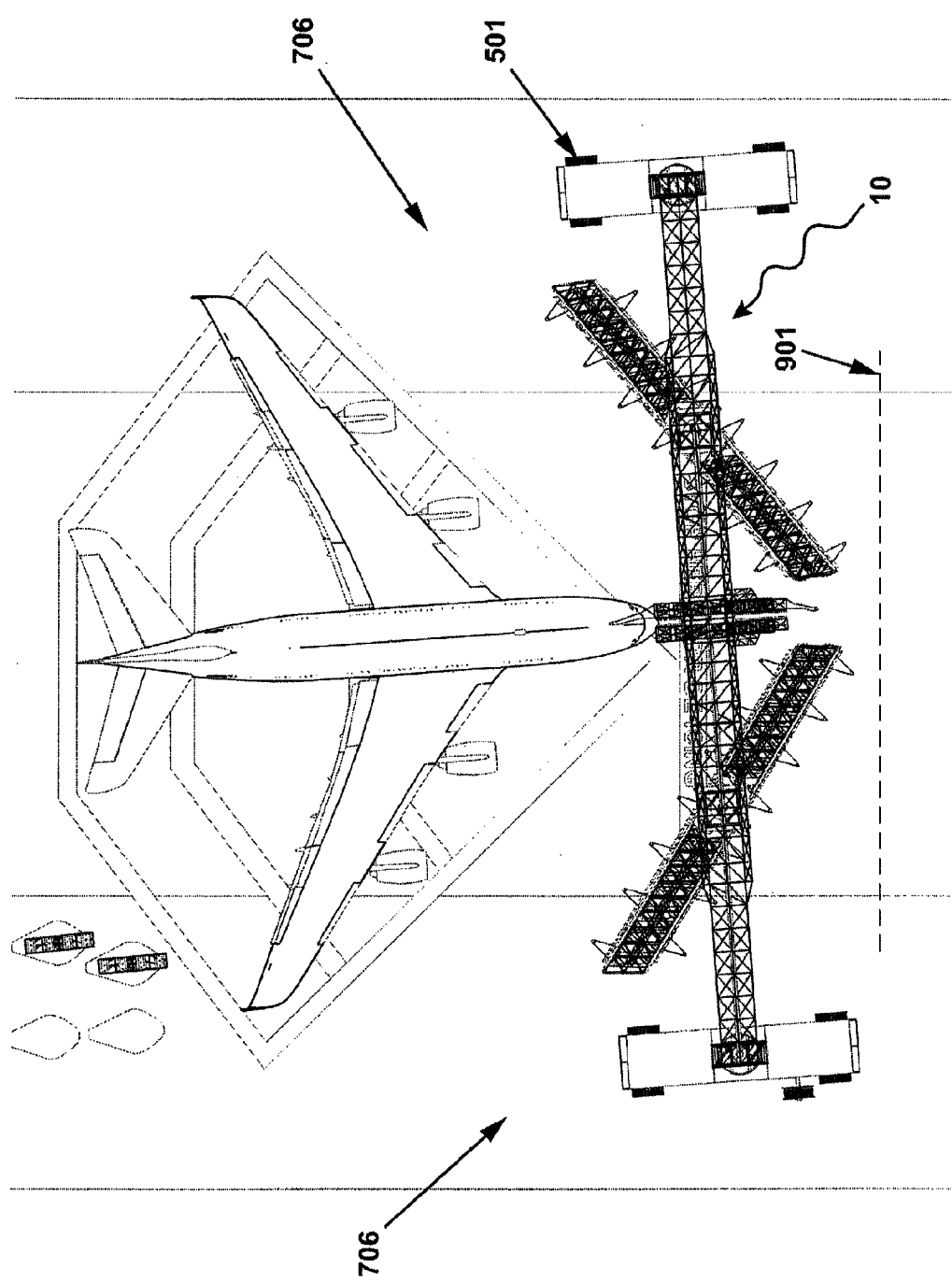
FIG. 2e is a top view of an exemplary deicing installation according to the present disclosure that is being moved into a deicing position relative to an aircraft.

FIG. 2e is a top view of the installation 10 riding on tarmac 706. Installation 10 is aligned with the off-centerline crabbing airplane before starting the deicing operation.

Figure 2F:
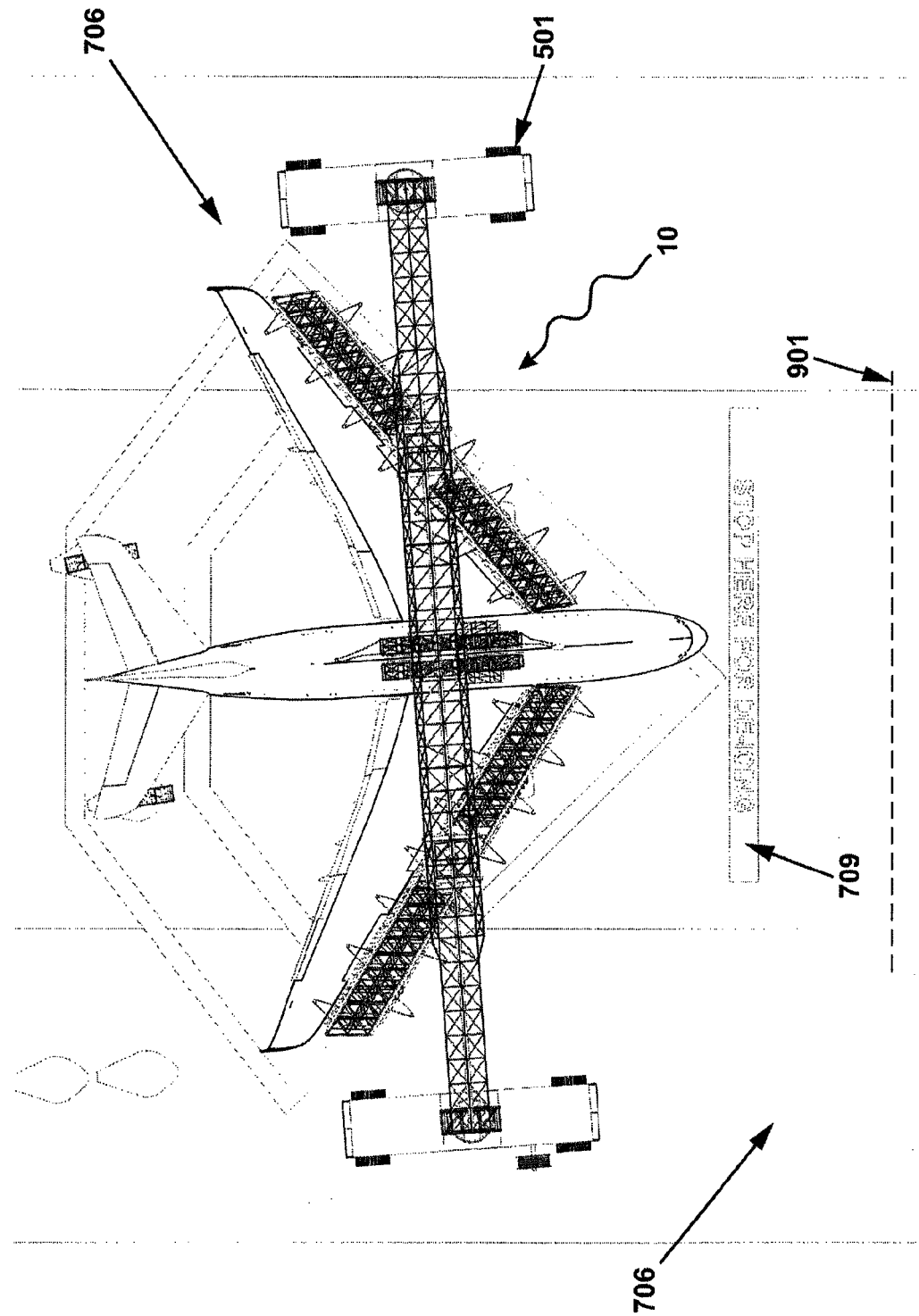
FIG. 2f is a top view of an exemplary deicing installation according to the present disclosure wherein the deicing operation is proceeding along the length of the aircraft.

FIG. 2f is a top view of installation 10 riding on the tarmac. The installation 10 is shown moving along, parallel to the airplane. Of note, no relative asymmetric situation exists in between the airplane and the installation 10 and therefore the clearance in between the installation 10 and the airplane are minimized.

Figure 3A:
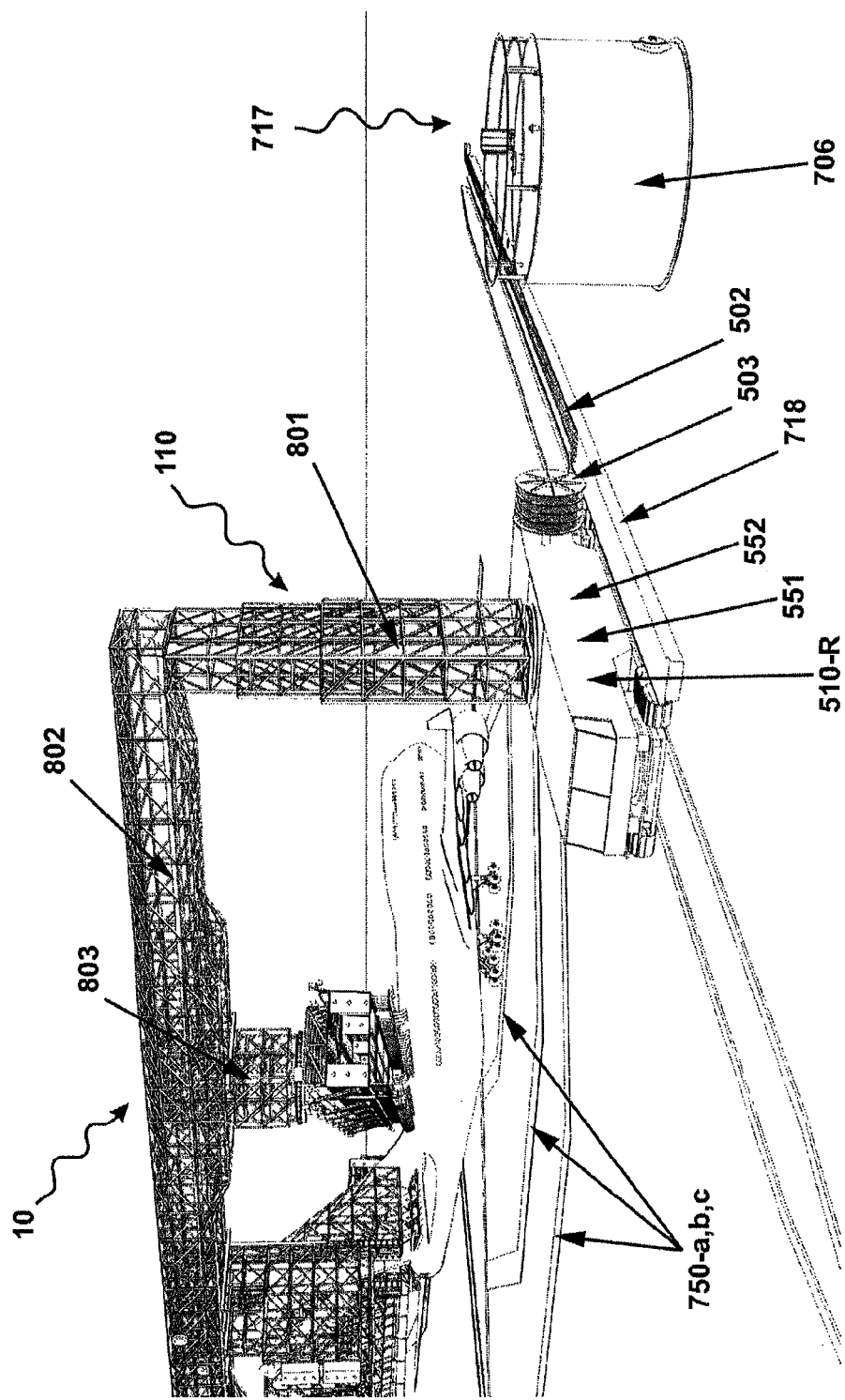
FIG. 3a is a rear side perspective view of an exemplary deicing installation according to the present disclosure that shows exemplary positioning of a storage vessel for deicing fluid.

FIG. 3a shows an exemplary fluid management ground facility 706 according to the present disclosure. Installation 10 is shown riding on steel rails 704. The polygons 750-a,b,c schematically represent run over deicing fluid collecting drains. The use of different collecting perimeters are recommended to reduce the dilution of the run-over fluids during rain/snow. Recycling the deicing fluids is energy-intensive and for cost and for environment's sake, dilution should be minimized.

The large perimeter 750-a is used to collect the deicing fluid when large airplanes are deiced while the smaller perimeter ones 750-b, 750-c are used commensurate with the size of the airplanes being deiced. While deicing a small airplane, the large perimeter polygon 750-a will collect mostly melted snow/ice while the small perimeter polygon 750-c will collect a mixture containing a higher concentration of deicing fluid suitable for reprocessing. The plurality of drains 750 advantageously allow separation of the different concentration deicing fluids or simply the disposal of the water when its contamination with deicing fluids is below an acceptable concentration.

The deicing speed of the disclosed installation is also an important factor in minimizing the dilution since lower time for deicing means less accumulation of water/snow on the collection surface. In exemplary embodiments where the deicing installation rides on the tarmac, some of the run over fluids may be directed to keep the tarmac clean along the routes used by the mobility units 500.

The structure 706 may be located underground, although it is generally recommended to house deicing fluid management means, such as pumps and tanks for fresh deicing fluids and collecting tanks for the spent, diluted fluid above ground, or they could be connected to remote tanks by pipes (not shown) or a combination of both.

While storage tanks could be optionally provided inside the cabins 501, it is recommended that the deicing installation is supplied with deicing fluids by hoses/pipes, such that the deicing installation 10 doesn't need to be stopped to be re-supplied by tanker trucks.

The underground pipes 717 for deicing fluid, for water and for anti-sticking fluid are generally connected to the hoses 502 which are reeled or un-reeled relative to reel 503 depending on which direction the installation 10 moves. A support/guide 718 for the hoses 502 is recommended.

Figure 3B:
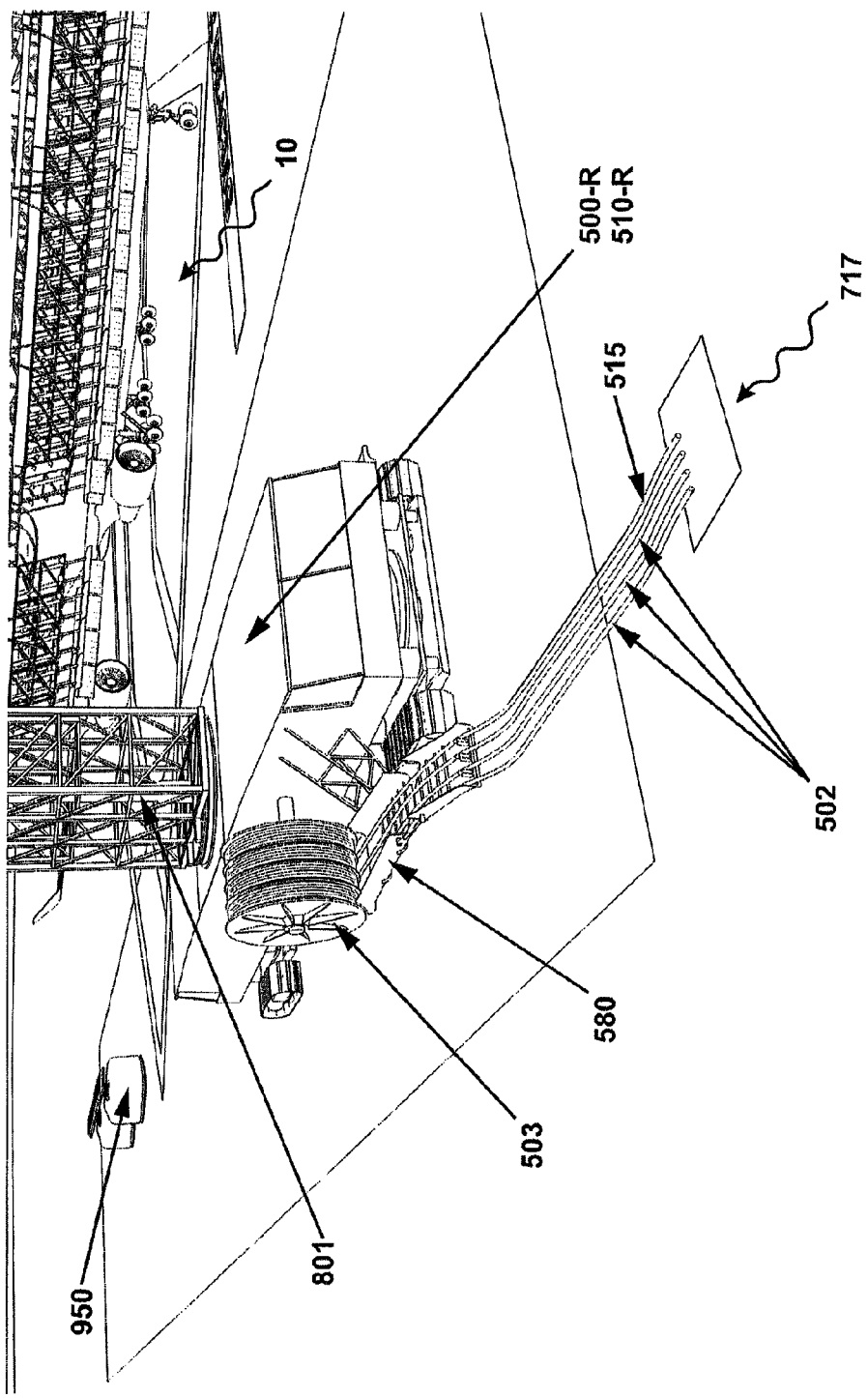
FIG. 3b is a front perspective view of a portion of an exemplary deicing installation according to the present disclosure that shows exemplary piping of deicing fluid associated with a fluid management subsystem.

FIG. 3b shows exemplary electric cable 515 and the deicing fluid, water and anti-sticking fluid supply hoses 502 for an installation riding on the tarmac. The hoses 502 lay on the tarmac and the funnel shape structure 580 provided on the cabins 501-R directs the hoses to the reel 503 or lays them on the tarmac, depending on the moving direction.

It is to be understood that any other types of connections of the installation 10 to the electric and fluid supplies that allows the installation 10 to move along the deiced airplanes are valid options, as will be readily apparent to persons skilled in the art.

The high deicing speed achievable by the disclosed deicing installation 10 is based on its architecture that allows the simultaneous deicing of large surfaces of the airplanes and this requires dispersing a large quantity of fluid in a very short period of time. Referring to FIG. 3a, buffer tanks 552 may be provided within the cabins 510- to reduce the size of the supply hoses 502 and generally the entire cost of the ground piping and pumping installation. The buffer tanks also reduce the level of installed power needed to heat the deicing fluids. Fluid storage tanks 551 could be also placed within the cabins 501 for the operators that prefer to supply the deicing installation 10 by tanker trucks.

Contouring and Proximity Structures

Figure 4A:
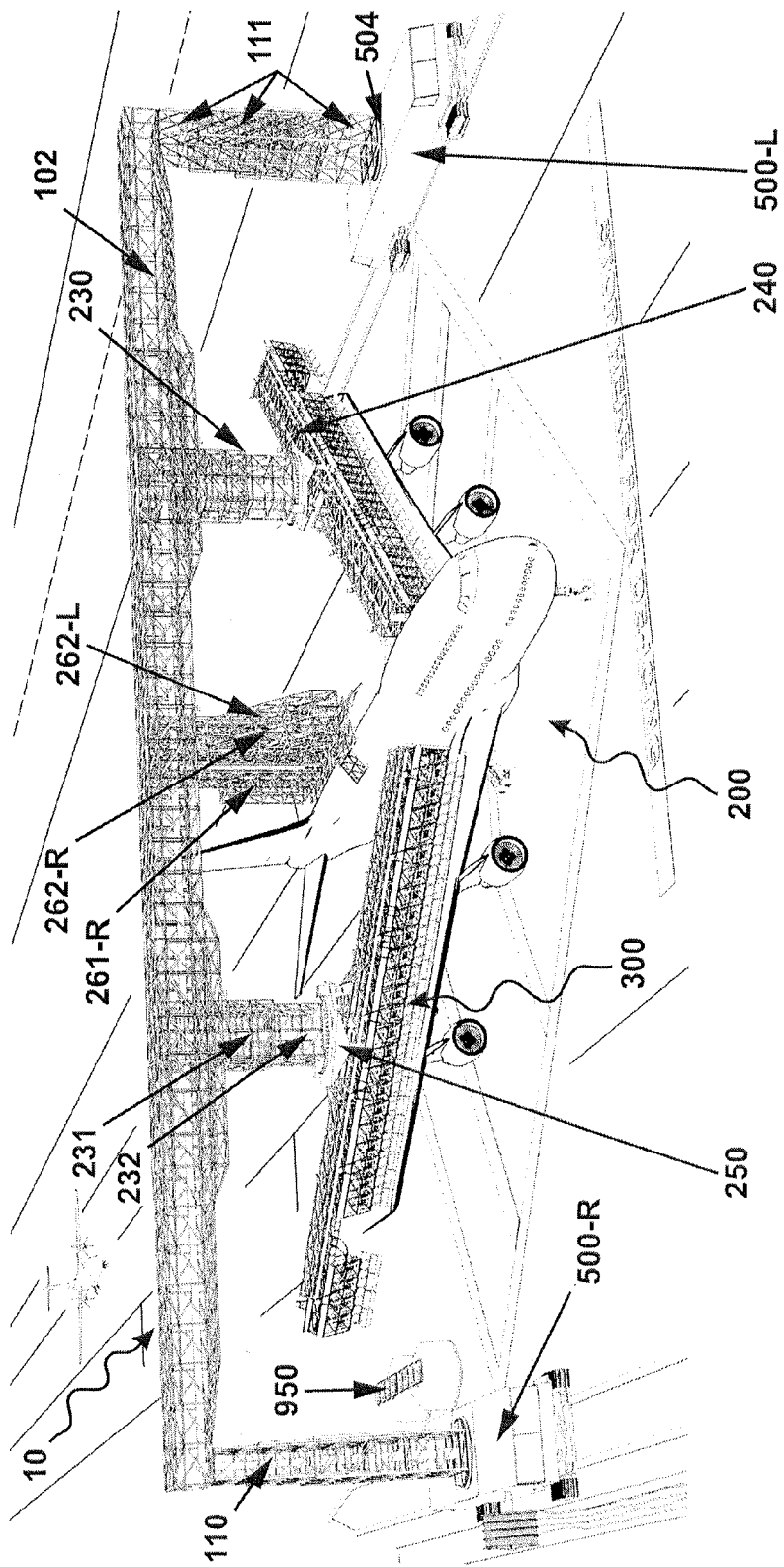
FIGS. 4a and 4b are front perspective views of an exemplary deicing installation according to the present disclosure showing interaction with a B747 airplane with winglets.

FIG. 4a shows a schematic view of exemplary deicing installation 10 in a configuration where the mobility units ride on steel rails. The deiced airplane is a Boeing 747 and the installation is shown at a moment when deicing the wing and part of the fuselage. FIG. 4a depicts exemplary contouring structures and exemplary proximity structures according to the present disclosure.

The exemplary contouring structure 100 includes a horizontal structural beam 102 that is attached with respect to the top of the two telescopic vertical poles 110, and a plurality of structural contouring members 200 that provide the platform on which deicing systems are installed directly. Alternatively, the deicing systems may be installed on the independently controlled proximity units 301 shown in FIG. 10, that collectively form the proximity structure 300.

As used herein, the deicing system may include various components/equipment that facilitate the following functions:

a) Application of the deicing means, anti-icing fluids, air jets and heat radiators, and the like, to the frozen contaminated areas of the airplane. Such deicing systems include different types of nozzles designed for impulse jets or for dispersion jets as respectively needed for black ice or for frost, actuators for changing the direction of application, and/or actuators or valves for controlling the flows.

b) Monitoring operations, i.e., different types of sensors to measure the temperature and/or flow of the deicing fluids, to measure the distance to the surface of the airplane, to detect frozen contamination or clean surface, videocameras to transmit images of the deiced surfaced to the deicing crew and the like.

The structural contouring members 200 allow the disclosed deicing system to move into close proximity to, i.e., operate at a relatively short distance relative to, the surface of the airplane.

Figure 10:
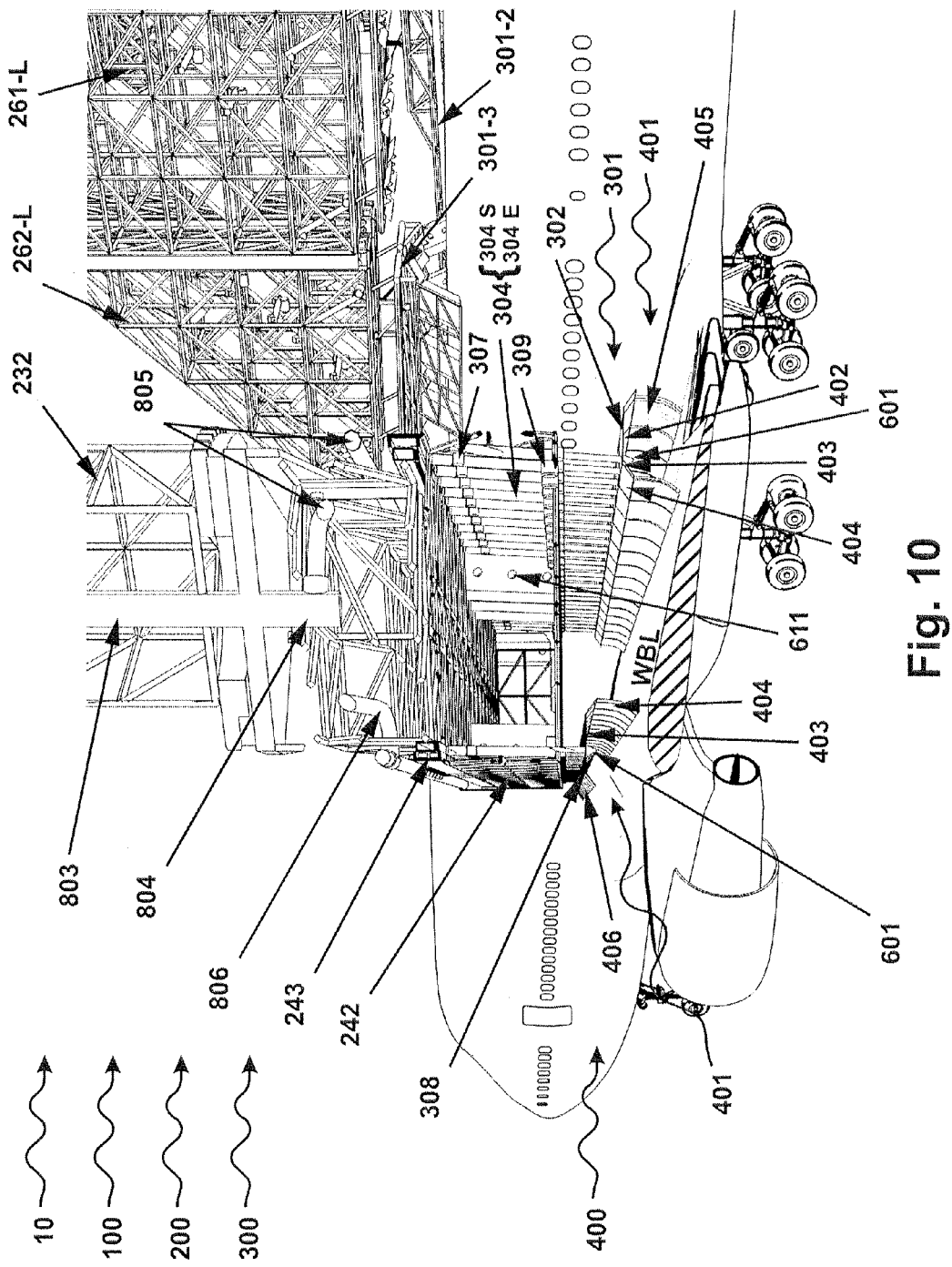
FIG. 10 is a side view of deicing structures, including proximity structures, associated with an exemplary deicing installation according to the present disclosure shown through the elevator, angular unit, main beam, sliding modules and relative to the wing of an airplane.

However, a preferred embodiment of the disclosed deicing system is provided with proximity structure 300 (FIG. 10). The inclusion of proximity structure 300 further increase deicing efficiency by providing a platform for the deicing systems that can operate even closer to the surface of the airplane without affecting safety, as better described in conjunction with FIG. 10.

A preferred embodiment of the disclosed deicing system also includes shield device(s) 401. Shield devices 401 are designed to save deicing fluids and preserve the thermal and mechanical energy of the deicing jets, as better described in conjunction with FIG. 10.

The consumption of deicing fluid may be reduced according to the present disclosure by using air-jets to blow the thick ice and especially snow prior to applying deicing fluid. Heavier deicing systems, e.g., air blowers, are not compatible with the proximity structure 300 and such heavier systems, if used, are generally to be installed on the contouring structure 200. The air blowers are intended mainly for cleaning of the wing root area—for simplicity, blowers are not shown in the figures illustrating the present invention.

Figure 4B:
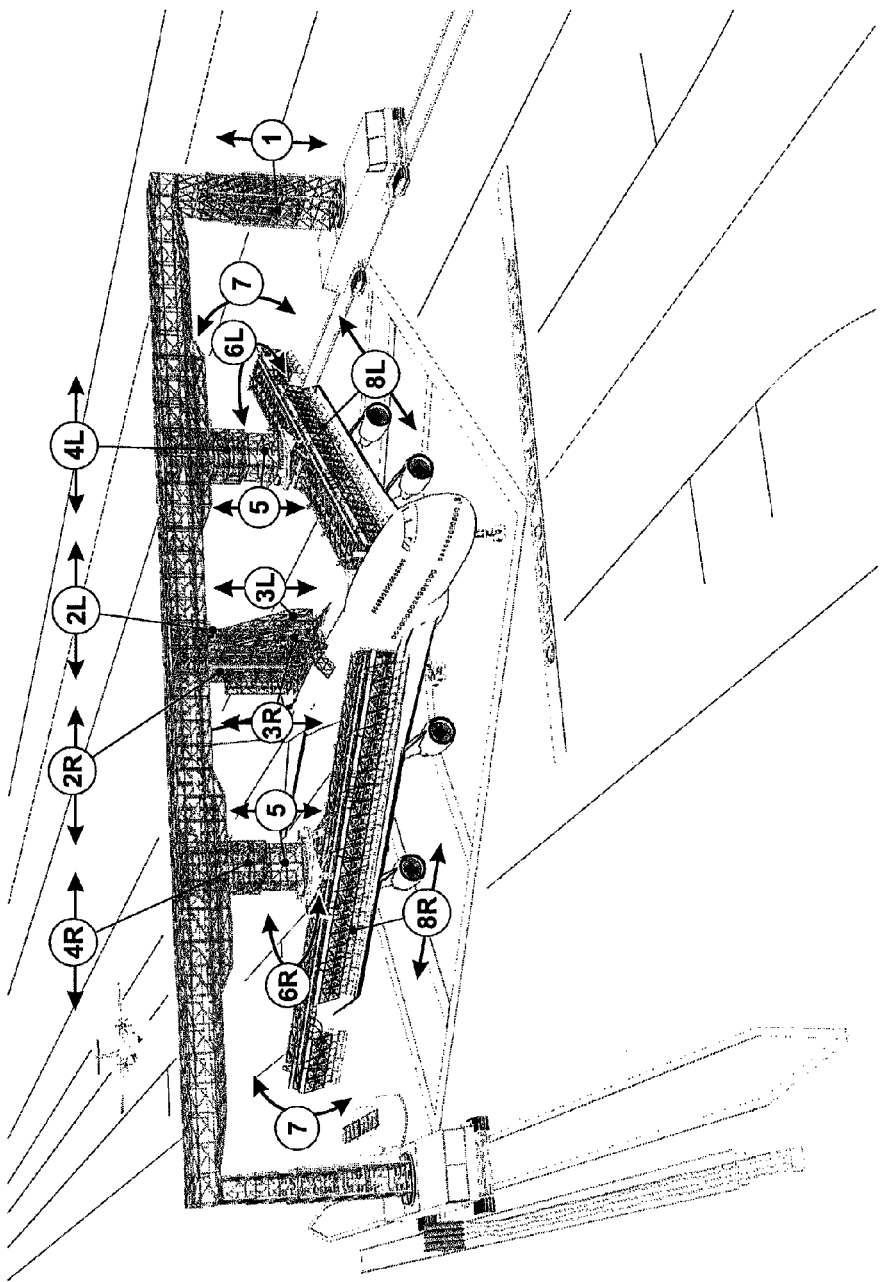

The height of the horizontal structural beam 102 is adjustable and a number of members of the contouring structure are mechanically inter-connected such that their relative positions are modifiable. Each particular degree of positional mobility is referred hereinafter as a "freedom degree," and the freedom degrees are illustrated in FIG. 4b Adjusting the relative positions of the contouring members is performed by actuator means, including but not limited to, electric, hydraulic, pneumatic, cables, gears, gear-racks and the like, controlled in real time by closed loop, preferably by numerical control system, fed with the type and position of the airplane as well as fed with the position and speeds of the mobility units 500 and of the structural contouring members 200. Additional safety margins are provided by independent authority proximity sensors.

For simplicity, hereinafter "controlled by actuator" refers to the entire closed loop control system.

After one deicing operation is completed and the airplane taxies away, the installation 10 returns to its home position while the structural contouring members 200 are positioned for the type of the next airplane in line for deicing and the independently controlled proximity units 301 (FIG. 10) forming the proximity structure 300 move into a retracted position.

Each telescopic vertical pole 110 is attached to a mobility unit 500 by bearing means 504 that allow the mobility units 500 to controllably rotate in respect to the vertical poles.

The mobility units 500 and, hence, the telescopic vertical poles 110, are spaced enough to allow the largest span airplane to pass through with safe clearance.

Actuator means control the height of the telescopic vertical poles 110 in a synchronized way to maintain the horizontal structural beam 102 essentially horizontal, hereinafter "freedom degree No. 1," and the structural horizontal beam 102 can be raised up to the required height to accommodate the maximum height plus safe clearance for the largest airplane operating from the airport served by the deicing installation 10.

Since the installation 10 operates on an airport, even if it meets object free requirements, it is recommended that the control software of the installation is programmed such that the horizontal beam structure 102 operates at the minimum height as necessary for each particular type of airplane and to its minimum height while in the waiting modes.

The installation disclosed herein will operate at its maximum height only for a short duration, e.g., when passing over the vertical fin of an Airbus 380.

Relocation of the installation is performed with the horizontal structural beam 102 secured in its lowest position as shown in FIGS. 18-22.

Vertical Fin Structure

The telescopic poles have two or more segments 111—three segments are shown in FIG. 4a On the horizontal structural beam 102, at essentially its middle position, there are installed two, left and right structures, hereinafter, "vertical fin structure(s)" 261—left-right independently slidable (only 261-R visible in FIG. 4a). The positions of the vertical fin structures are controlled by independent actuators and the slidable mobilities, referred hereinafter as "freedom degree No. 2-L" and "Freedom degree No. 2-R" (see also FIG. 12, FIG. 13, FIG. 14, FIG. 15 and FIG. 16).

While the structures 261 are symmetrical, the freedom degrees No. 2-L and No. 2-R are independent as they are used to adapt the clearance in between the two vertical fin structures 261-L and 261-R and as well as their positions along the horizontal structural beam 102 to safely pass over the fins of the airplane that is stopped in an acceptable position for deicing. As previously note, the acceptable positions also include off centerline and/or crabbed airplanes.

Figure 15:
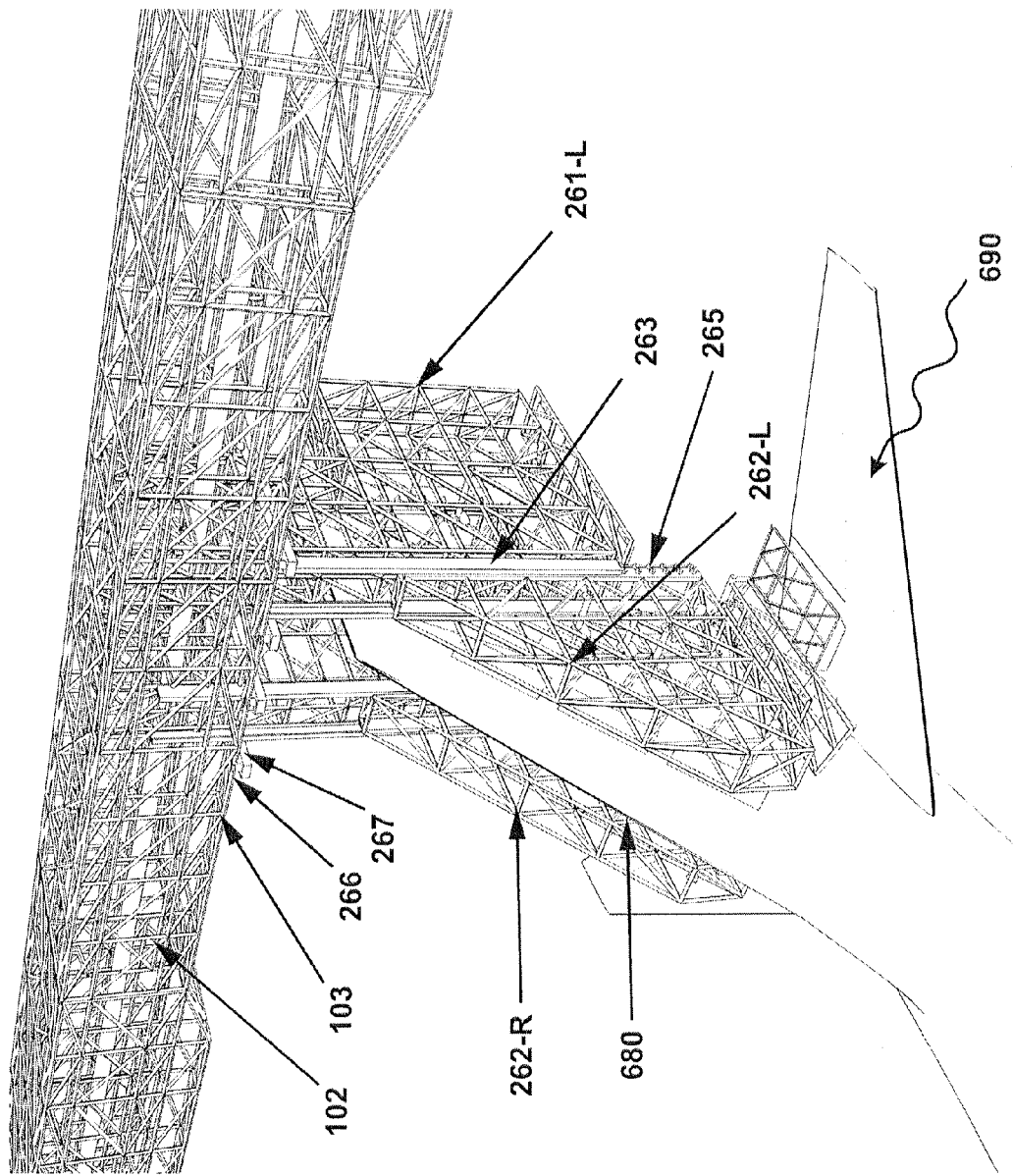
FIG. 15 is a side perspective view of an exemplary deicing installation according to the present disclosure deicing the tail region of an illustrative airplane.

In a preferred embodiment, the mobile, slidable attachment of the vertical fin structures 261 to the horizontal structural beam 102 is realized by two rails 103, see FIG. 15, solidly attached on the lower front and rear sides of the horizontal structural beam 102. Each rail is trapped in between a plurality of roller sets 266 attached at 267 to the vertical fin structure 261 such that the vertical fin structure contributes to the strength and stability of the horizontal structural beam 102.

However, many other types of slidable attachments could be used as well if the structural integrity is not affected.

On the front side of each vertical fin structures 261, there is installed vertically slidable modules 262, hereinafter "vertical fin extension(s)," that are controlled by actuators to achieve mobility referred hereinafter as "freedom degree No. 3."

Freedom degree No. 3 is used to adjust the height of the vertical fin extensions 262 to the different sizes of vertical fins and fuselage heights of the airplanes to be deiced.

Figure 16:
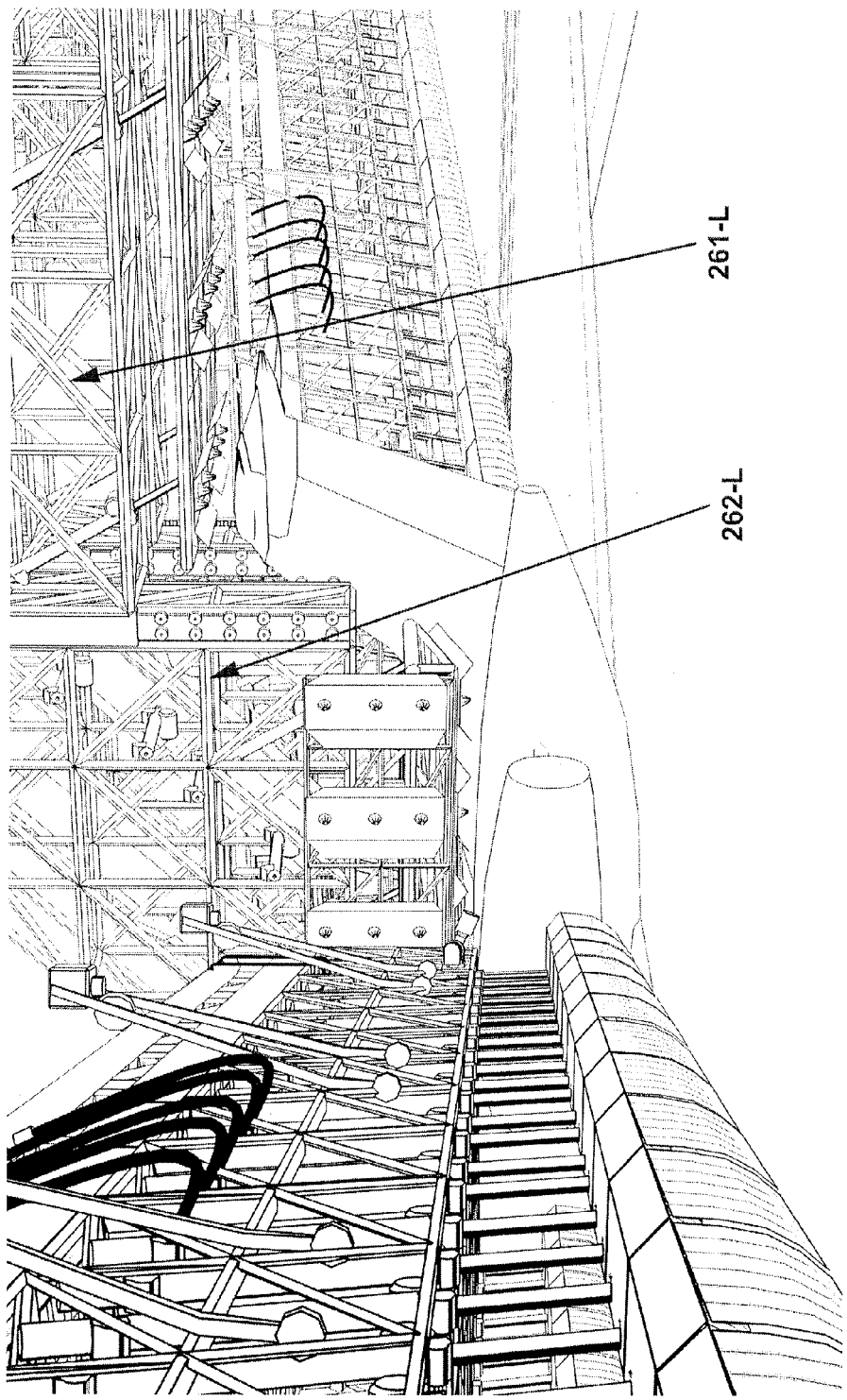
FIG. 16 is a side view of an exemplary deicing installation according to the present disclosure showing interaction with the rear portion of an airplane.

In a preferred embodiment, the vertical fin extensions 262 slide on rollers 265 that are trapped inside U-shape profiles 263 attached to their vertical fin structures 261 as shown FIG. 16, but many other types of slidable attachments could be used as well.

Referring to FIG. 4a, the height of the vertical fin structures 261 is controlled by the Freedom Degree No. 1, that is the height of the two telescopic vertical poles 110 supporting the horizontal structural beam 102 to which the vertical fin structures 261 are attached.

The vertical fin extensions 262 are raised or lowered in respect to the vertical fin structures 261 by their own actuators. Normally both vertical fin extensions 262 move in a synchronized way, except when an asymmetric situation exists on the deiced airplane, an antenna or the like.

Until the vertical fin extensions 262 are completely raised, their height over the fuselage and over the horizontal stabilizers are controlled by the freedom degree No. 3 in correlation with freedom degree No. 1 and with the motion of the installation 10. After the vertical fin extensions 262 reach their upper limit position, they move together with the main central structure 261, their heights over the fuselage and over the horizontal stabilizer are controlled by the freedom degree No. 1, the height of the telescopic vertical poles 110 (see FIG. 4b), in correlation with the motion of the installation 10.

The deicing systems are provided on the inboard side and on the lower side of the vertical fin structures 261 and vertical fin extensions 262.

Figure 7:
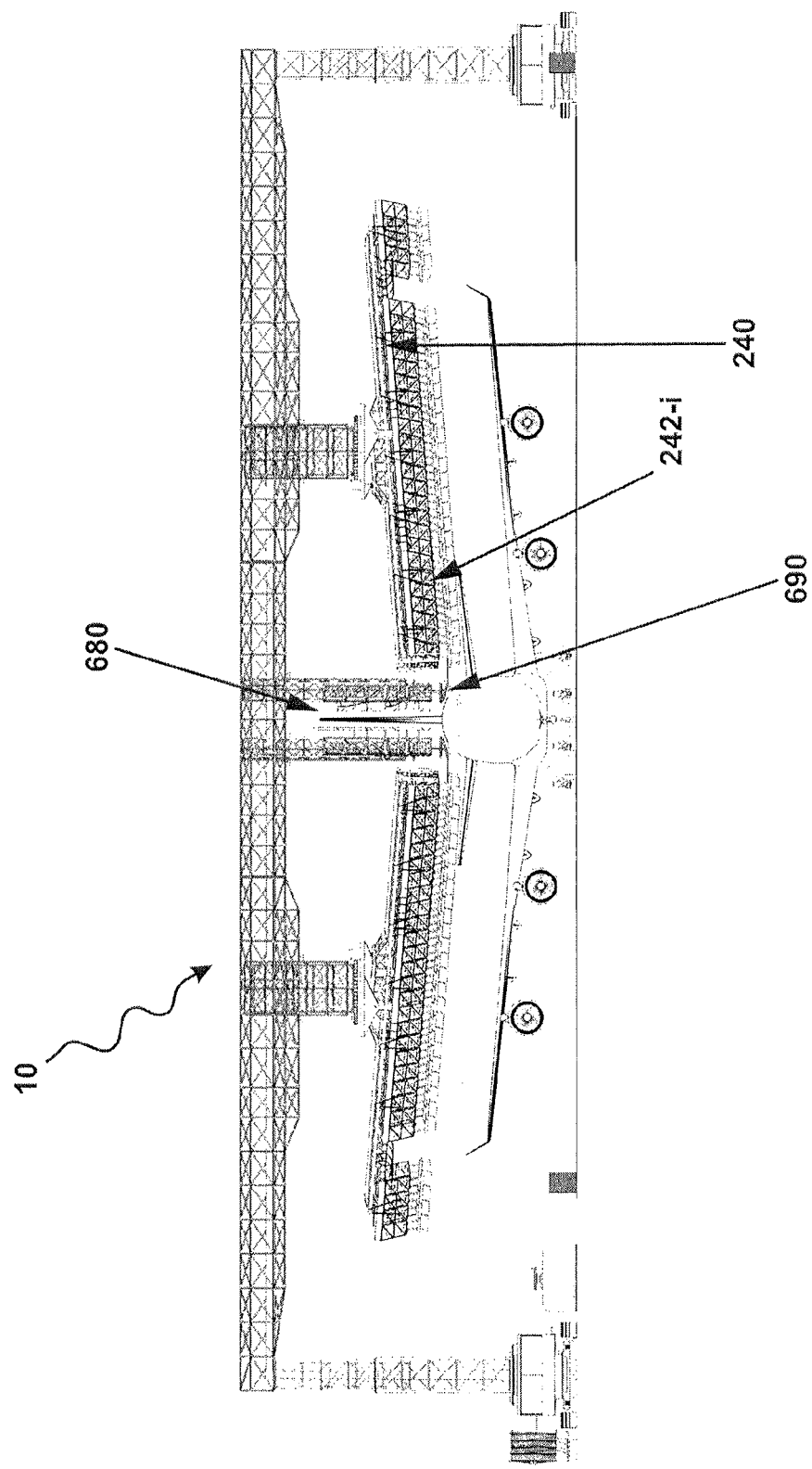
FIG. 7 is a front view of an exemplary deicing installation according to the present disclosure showing the deicing installation in the position for deicing the horizontal stabilizer of a B747 airplane.
Figure 11:
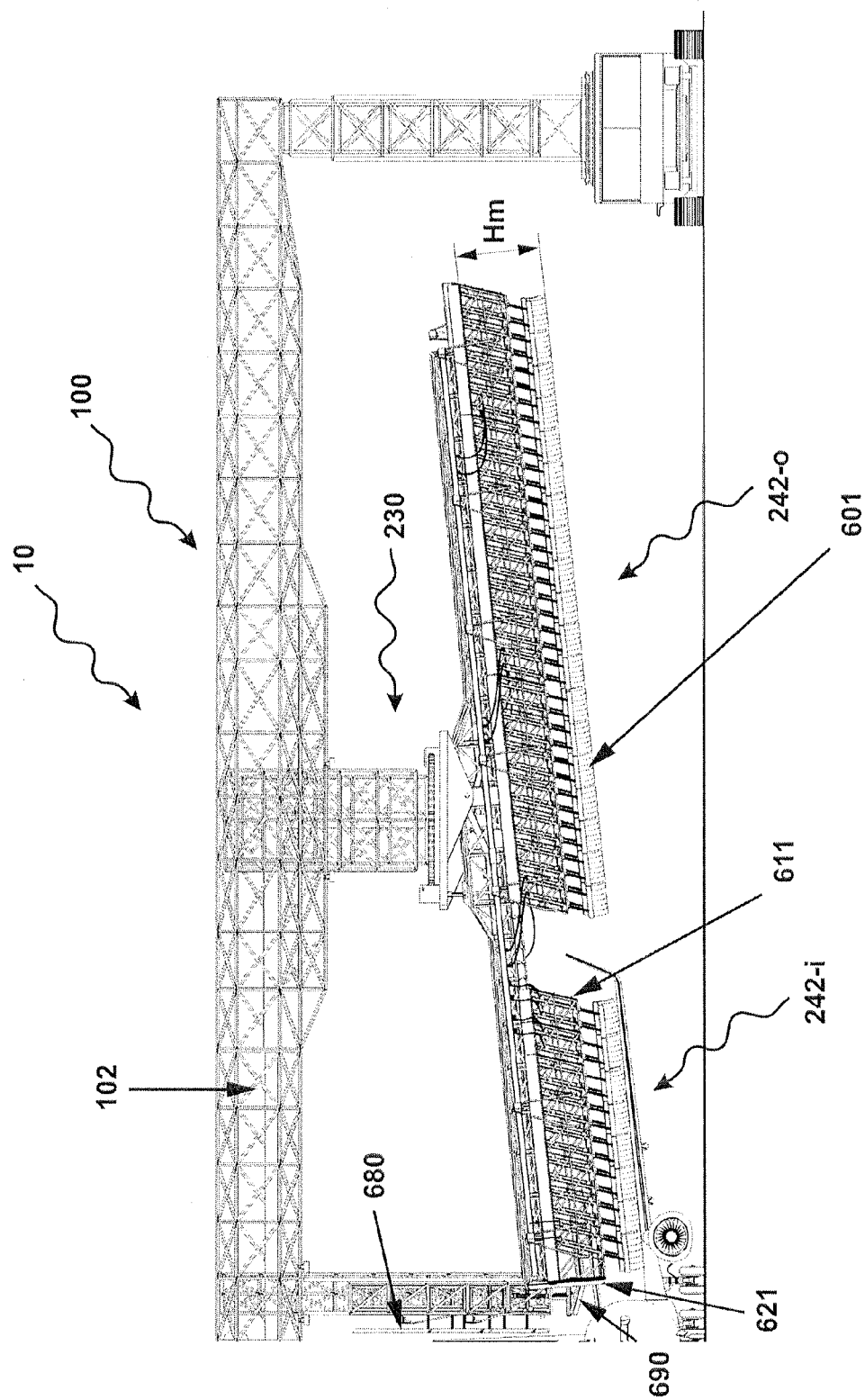
FIG. 11 is a front view of one side of an exemplary deicing installation according to the present disclosure showing adjustable piping subsystems that delivers deicing fluid to the disclosed nozzles.
Figure 12:
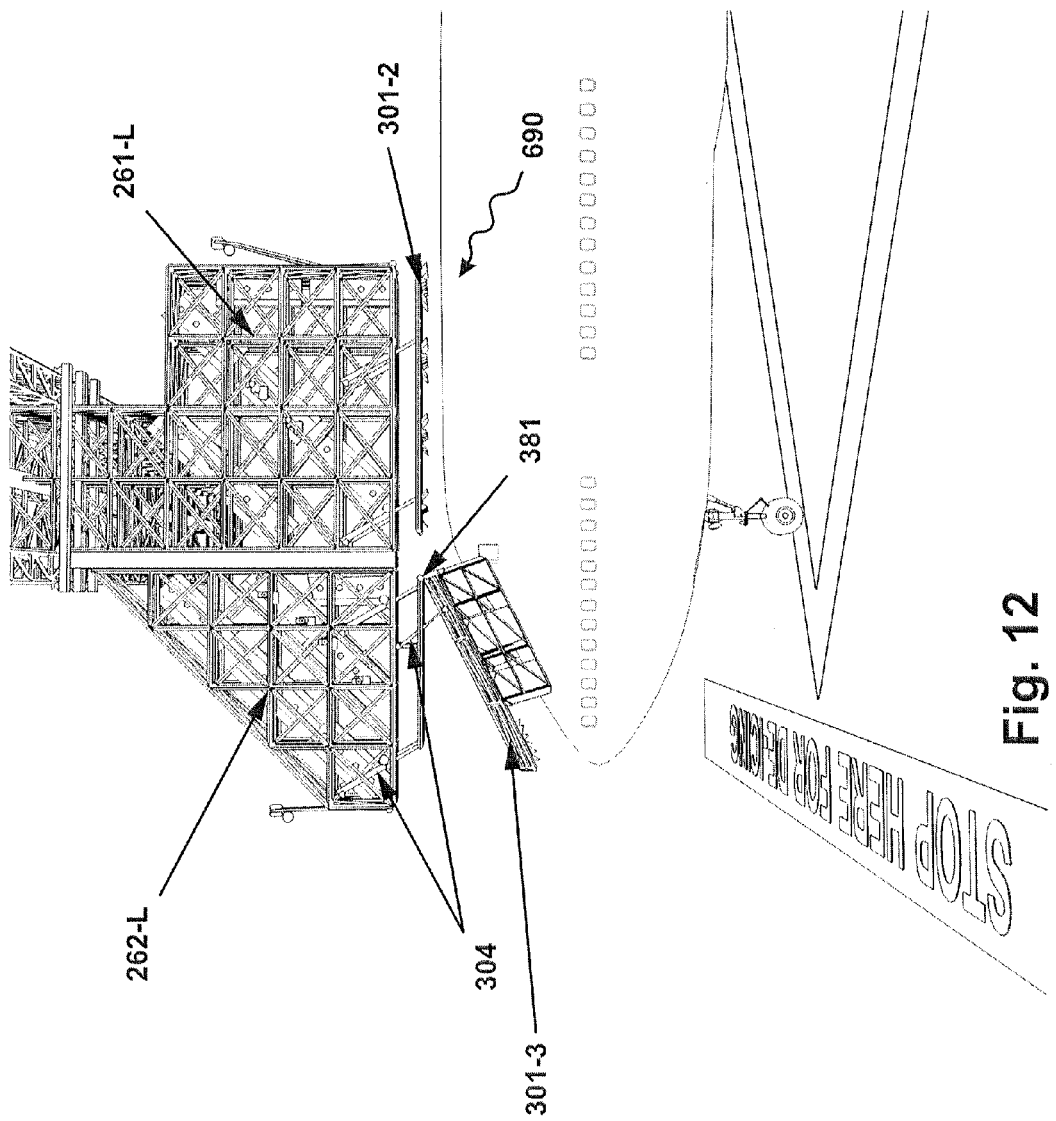
FIG. 12 is a side view of an exemplary deicing installation according to the present disclosure showing interaction with the nose region of an Boeing 747 airplane.
Figure 13:
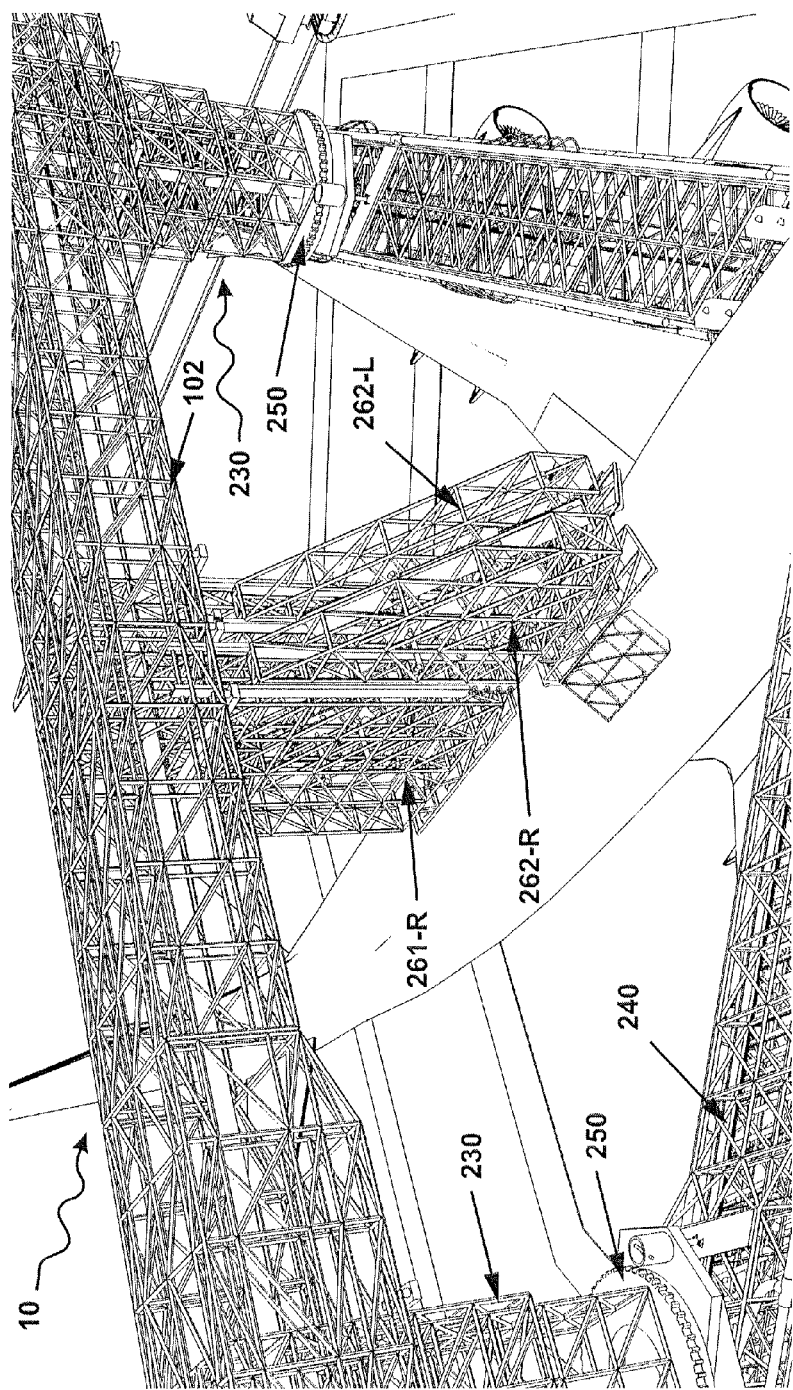
FIG. 13 is a front perspective view of an exemplary deicing installation according to the present disclosure showing the position of the sliding units in a position for allowing desired clearance relative to a Boeing 737 airplane's winglets and the central contouring structure/proximity structure that deice the fuselage.
Figure 14:
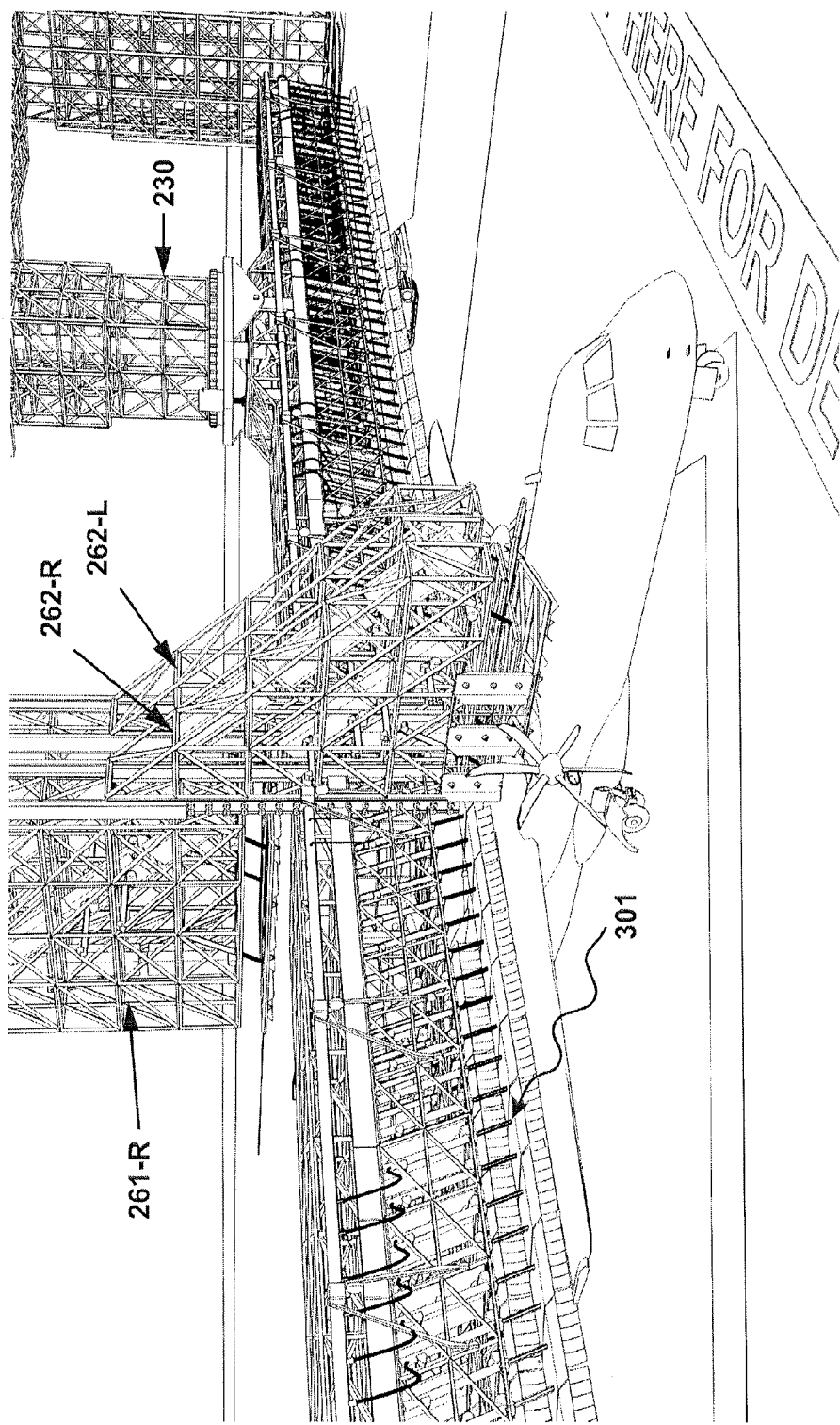
FIG. 14 is a side perspective view of an exemplary deicing installation according to the present disclosure deicing an illustrative propeller-driven airplane.

The inboard deicing systems 680 are used to deice an airplane's vertical fin and are more visible in FIG. 7 and FIG. 11 (B747 shown), while the deicing systems 690 installed on the lower sides of the vertical fin structures 261 and of the vertical fin extensions 262 are used to deice the top of the fuselage as shown in FIG. 2a (A380 shown), FIG. 11 and FIG. 12 (and other figures), and at least part of the horizontal stabilizers as shown in FIG. 15 (B 747 shown).

FIG. 12 shows the nose of a B747 being deiced by a deicing system according to the present disclosure, including the proximity units 306 (the proximity units are described in the following in conjunction with FIG. 10) that are rotated against pivot means 381 attached to the lower rear side of the vertical fin structures 262

Downward Vertical Structures

Referring to FIG. 4a, in between the telescopic vertical poles 110 and the vertical fin structures 261, there are two vertical structures 230—extending downwards, hereinafter downward vertical structures, that are inboard-outboard slidably attached to the horizontal structural beam 102, the mobilities being controlled by independent actuators, and referred hereinafter as "freedom degree No. 4-L" and "freedom degree No. 4-R."

The freedom degrees No. 4-L and No. 4-R are used to adapt to different fuselage size, and also to adapt to airplanes that are off centerline and/or crabbing.

In a preferred embodiment, where the installation 10 rides on the tarmac, the freedom degree No. 4-L and No. 4-R are used symmetrically since the installation 10 moves along the centerline of the airplane as better seen in FIG. 2f. The freedom degrees are used in this case only to adapt to the size and shape of the fuselage in correlation with the angular adjusting unit 250 described herein below.

Figure 8A:
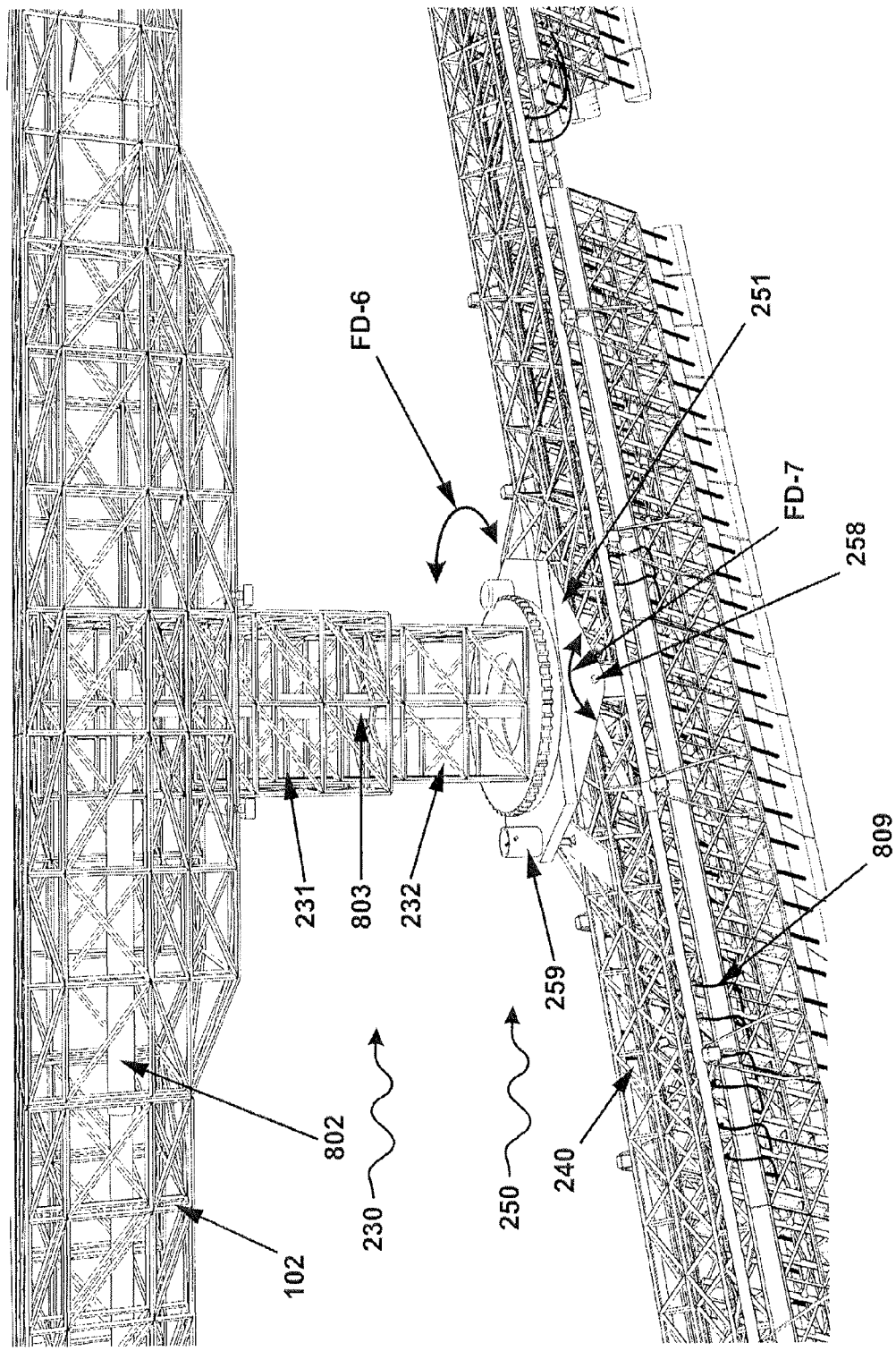
FIGS. 8a-8c are views of an exemplary angular adjusting unit, elevator and other structural elements of an exemplary deicing installation according to the present disclosure.
Figure 8B:
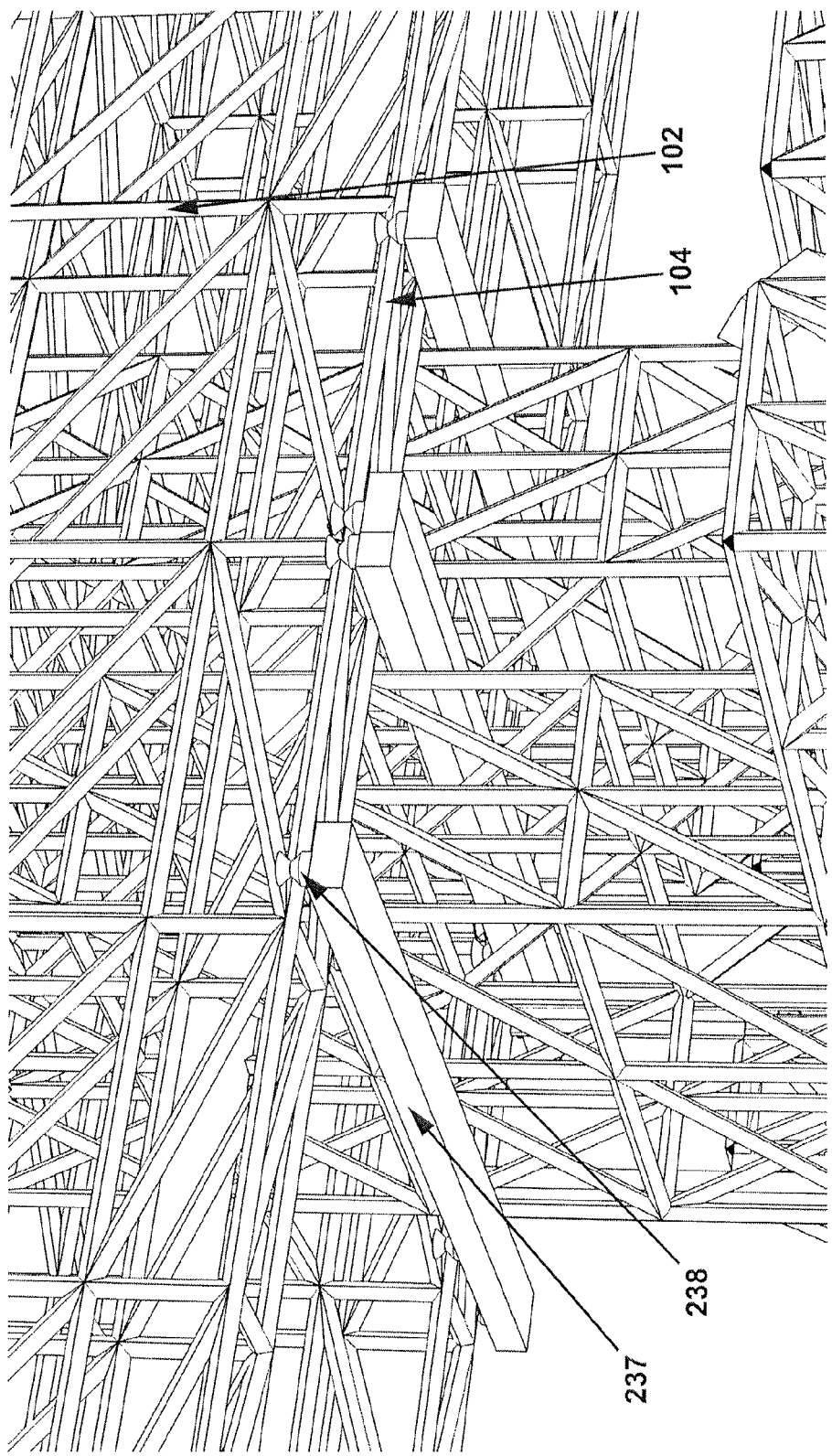

In a preferred embodiment, the slidable attachment of the vertical structures 230 with respect to the horizontal structural beam 102 is realized by four rails 104, one visible in FIG. 8b, solidly attached to the horizontal structural beam 102, two in its front upper and lower positions and two on the rear side upper and lower positions.

Each rail is trapped in between a plurality of roller sets 238 attached to the vertical fin structure 237 such that the vertical fin structure contributes to the strength and stability of the horizontal structural beam.

However, any other attachment type that provides slidable relative motion without affecting the structural integrity could be used.

A preferred embodiment of the present disclosure provides for a telescopic construction of downward vertical structures 230, their heights, hereinafter referred as "freedom degree No. 5," are controlled by actuators such that, in correlation with the freedom degree No. 1, they extend downwards or retract upward to adapt to the different geometry and sizes of the airplanes to be deiced. The telescopic construction include a plurality of segments—e.g., two segments 231 and 232, as shown in FIG. 4a Each telescopic downward vertical structure 230 has its own actuators, but both the structures move in a synchronized way.

The Over-Wing

Referring to FIG. 4a and FIG. 8a, at the lower end of each telescopic downward vertical structure 230 there is an angular adjusting unit 250 to which an elongated beam structure, hereinafter "over-wing beam" 240, is attached. The center of gravity of the over-wing beam 240 is as close as practical to the vertical axis of the downward vertical structure 230 in order to balance and reduce the weight of the structure.

Figure 6:
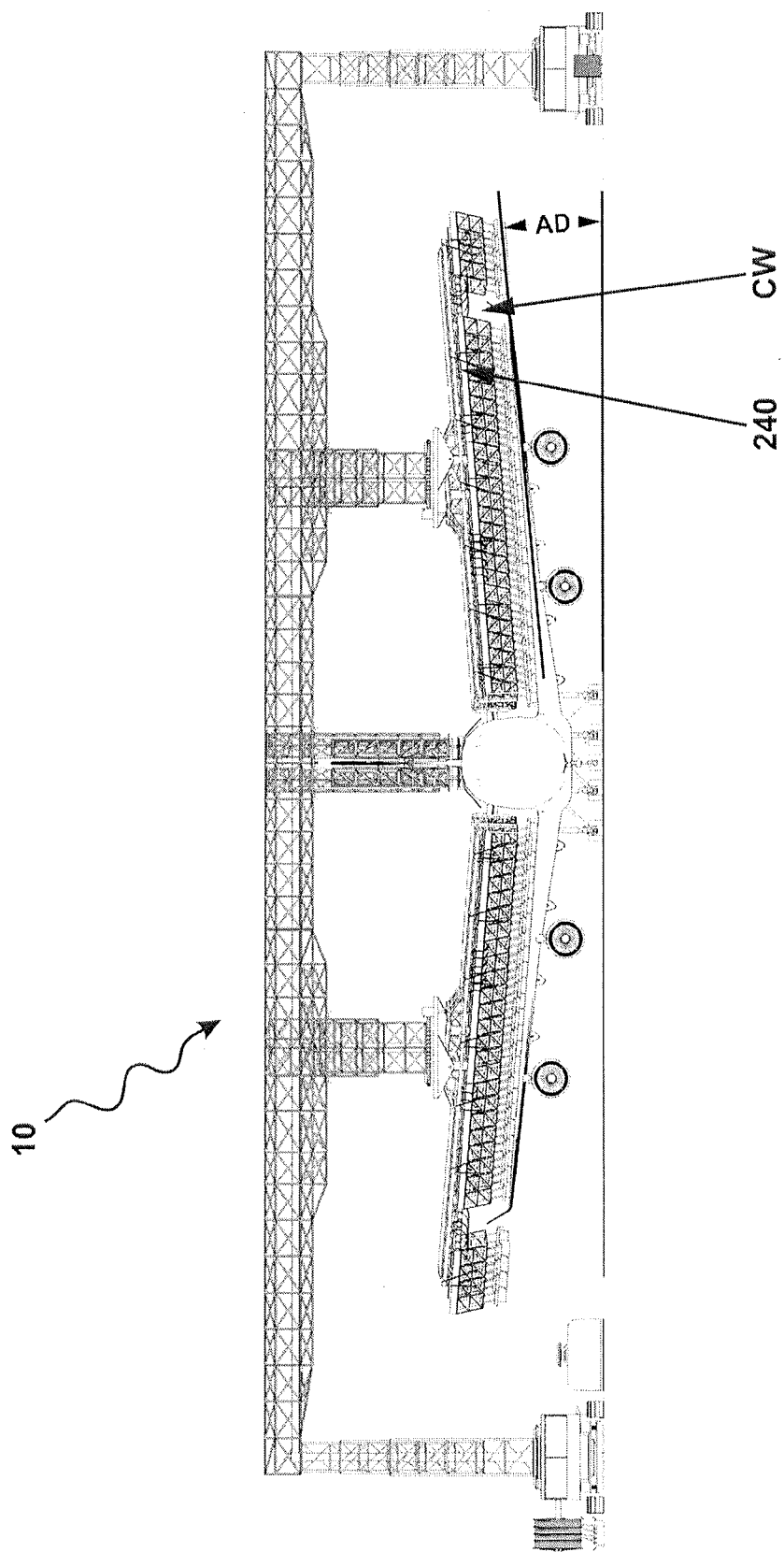
FIG. 6 is a front view of an exemplary deicing installation according to the present disclosure showing the dihedral angle of the wings of a B747 airplane and the deicing installation is shown in the position for deicing the wings and fuselage.

The height of the over-wing beam 240 is correlated to the height of the wing of the airplane as better shown in FIG. 4a, FIG. 6, and FIG. 11, or to the height of the horizontal stabilizer as better shown in FIG. 3a and FIG. 7, by the freedom degree No. 3 (see FIG. 4b) of the downward vertical structure 230 combined with the freedom degree No. 1 of the vertical poles 110.

The function of the angular adjusting unit 250 is to adjust the angular position of the over-wing beam 240 in horizontal and in vertical planes to correlate with the swept and dihedral angles of the wings and of the stabilizers.

Figure 5:
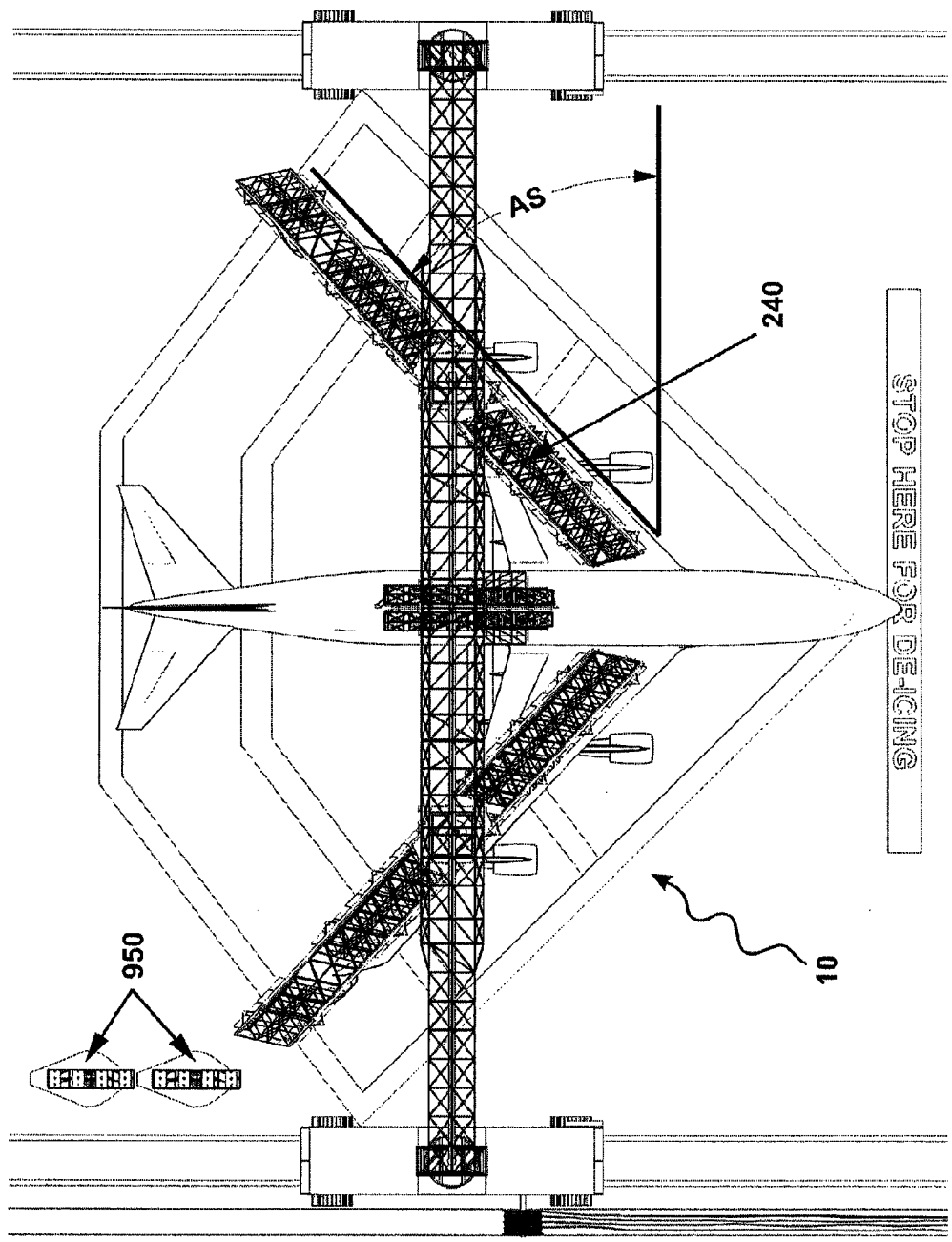
FIG. 5 is a top view of an exemplary deicing installation according to the present disclosure showing the swept angle of the wings of a B747 airplane and the deicing installation is shown in the position for deicing the wings and fuselage.

FIG. 5 provides a top view showing the swept angle As of the wing (Boeing 747 shown).

FIG. 6 is a front view that shows the dihedral angle Ad of the wing (Boeing 747 shown).

FIG. 7 is a front view that shows the dihedral angle Ad of the horizontal stabilizer (Boeing 747 shown).

The angular alignment allows the disclosed system to maximize the surface that is simultaneously deiced and minimize the average distance in between the deicing means and the upper surface of the wing, thereby translating to increased efficiency and speed.

Figure 8C:
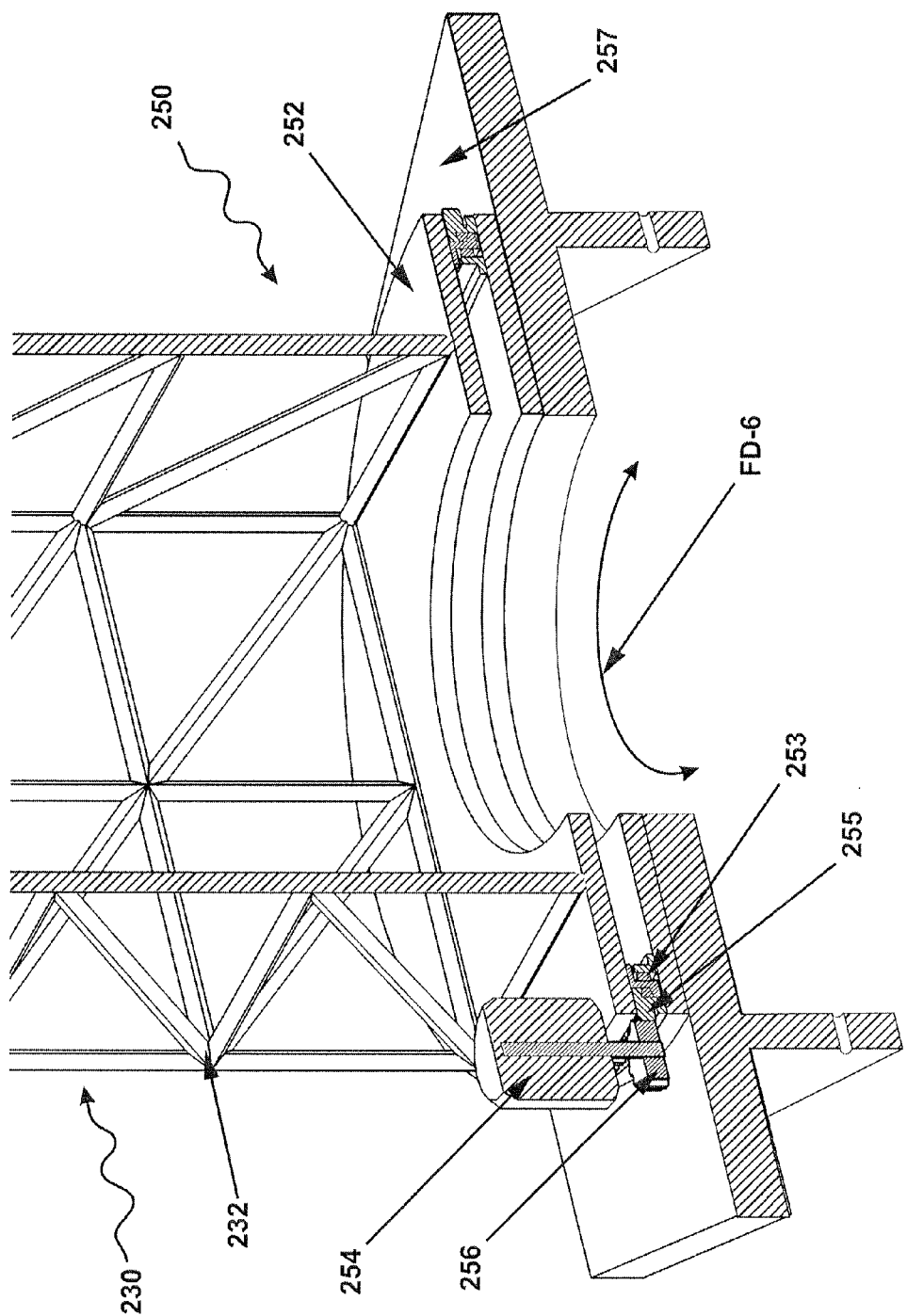

FIG. 8c shows a detail section through the angular adjusting unit.

The angular adjusting unit 250 has an upper structure 252 bolted to the lower side 232 of the downward vertical structure 230 and it includes bearing means 253 such that the lower structure 251 can be rotated by actuators around a vertical axis. This mobility is referred hereinafter as freedom degree No. 6. The actuating system is shown as a motor 254, provided with gear 256 that engages the gear 255 that encloses the bearing means 253, and gear 255 is attached to the lower structure 251 of the angular adjusting unit 250.

The over-wing beam 240 is attached to the lower structure 251 of angular adjusting unit 250, by bolt or bearing means 258 in FIG. 8a that allows the over-wing beam a limited rotation in vertical plan, freedom degree No. 7, as controlled by the actuator 259.

Besides the exemplary embodiments described above, there are other structures that could provide the two angular freedom degrees without departing from the basic idea of the invention which is to align the over-wing structure with the angles of the wing and of the horizontal stabilizer, and such alternatives are expressly encompassed within the scope of the present disclosure.

The Modules

Referring to FIG. 11, along the length of the over-wing beam 240 there are slidably installed a plurality of modules 242, extending downward and having a height Hm about the same as the tallest winglets of the deiced airplanes. The modules are normally connected to each other starting from inboard to outboard position, except when the airplane being deiced is provided with winglets.

The modules 242 are part of the structural contouring member group 200 of the contouring structure 100 and they have the special role of accommodating airplanes with winglets.

Based on the wing span of the aircraft to be deiced and in correlation with the freedom degree No. 4-L, No. 4-R, No. 6-L and No. 6-R, actuators slide a number of modules outward 242-o for a distance, the number and the distance collectively referred hereinafter "freedom degree No. 8-L" and "freedom degree No. 8-R. Passageway CW (see FIG. 11) is formed in between the inboard and the outboard modules, the clearance being wide enough to allow the installation 10 to safely clear the winglets of the airplane to be deiced while the height of the lower side of the modules 242, as resulting from the combination of the freedom degree No. 1, freedom degree No. 5. and freedom degree No. 7, pass in close, but safe distance over the upper surface of the wing when the installation moves along the airplane as shown in FIG. 11

In a preferred embodiment, where the installation 10 rides on the tarmac, the freedom degree No. 8-L and No. 8-R are used symmetrically since the installation 10 moves along the centerline of the airplane, such that the distance from the installation's centerline to the left and right winglets is the same.

The function of the modules 242 is illustrated in FIG. 11, and as shown therein, they offer for the deicing systems a platform that, despite the very large winglets of some types of airplanes, can safely move close to the surface of the wing, the most important surface to be deiced.

Additionally, the modules 242 offer close, convenient platforms for deicing the side of the fuselage and the winglets.

FIG. 10 shows an exemplary installation of the sliding modules on the over-wing beam 240. The modules are hanging on rolls riding on the U-shape profiles 243 attached to the over-wing beam 240. Any other system providing the sliding mobility of the modules could be used without departing from the requirements of present invention.

The position of the sliding modules 242 along the over-wing beam 240 is controlled by actuators that could be of gear-rack or cable type (not shown) or the like, such that they provide the appropriate clearance for the airplanes provided with winglets as shown CW in FIG. 11 (B737) and in FIG. 6 (B747).

General Considerations on Detail Designing the Installation's Structures

According to the present disclosure, it is generally recommended that all structures are detail-designed as light as possible. This is especially important for the hanging, mobile structures; the further the individual components are from a non-hanging structure, the higher the weight amplification factor is.

Besides the structural aspects, a low inertia enables higher accelerations and speed while reducing the load on the actuators and on their drivers and, in the end, light design increases the safety margins of the installation.

However, the structures are required to be stiff to avoid high-amplitude, low-frequency vibrations while the structural contouring member change the position or unacceptable, unsafe deformation may occur when an asymmetric load is applied, like in the case of the jet reaction force on the over-wing beam when deicing the wings of a small airplane (only the inboard portion will see such a reaction).

General Considerations on the Construction of the Modules

The number of modules is minimized as the number of types of airplanes is limited—the modules are of different lengths as required. This applies particularly well to preferred embodiments where the installation rides on tarmac since there is no bias caused by off-centerline and/or crabbed position of the airplane.

The modules will provide passageway for the operators of the installation, both for servicing and for directly supervising the quality of the deicing, e.g., modules in which a minimum accommodation is provided for 1-3 persons over-wing process monitoring crew.

Modules provide the platform for installing air blowers in the wing-root area if the designers opt for inclusion of such blowers. Modules also provide the platform for ice detection and monitoring means.

The modules should be as wide as practical (the width is considered in a direction perpendicular to the over-wing beam) taking into account balancing and transportation. In particular, the embodiments shown in the appended figures allow the transportation of modules in 40 ft. containers if they are disassembled in two halves.

Besides proximity, width, equivalent with nozzle covered area, is one of the main factors enabling high deicing speed. High moving speed along the airplane without affecting deicing quality is achieved by the disclosed installation by using multiple rows of nozzles traversing at relatively high speed.

Figure 9:
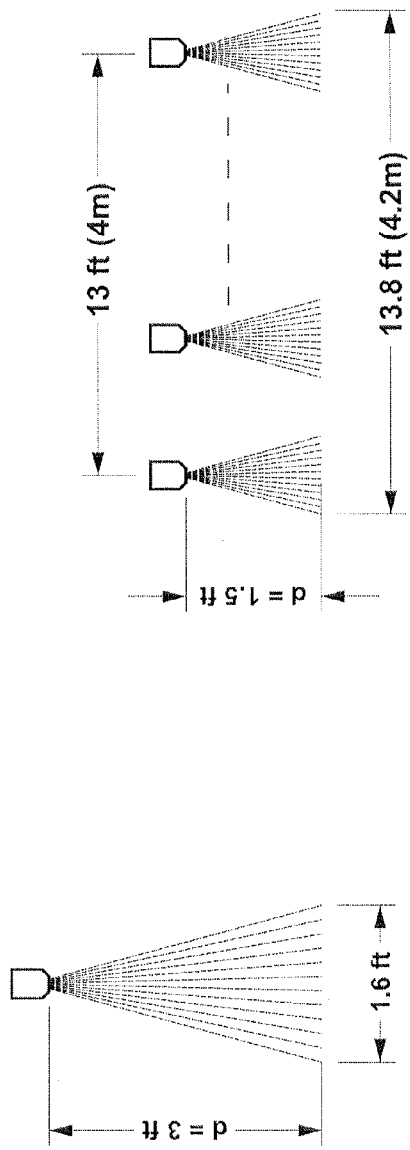
FIG. 9 are schematics of exemplary nozzle spray patterns according to exemplary embodiments of the present disclosure.

FIG. 9a and FIG. 9b illustrate by example a basic principle of the disclosed installation. FIG. 9a shows nozzles placed in a single array at 3 ft distance from the deiced surface and having a cone of 30°. Such an array could perform the deicing at a traversing speed of 0.5 ft/sec, equivalent to each deiced point spending 3.2 seconds inside the direct jet. Same deicing (3.2 seconds) could be achieved at 2.75 ft/sec with nozzles placed in multiple arrays covering a length of 8.8 ft instead of 1.6 ft as in the first case. In the case of multiple arrays, the jets do not need to intersect, they could be installed well apart since the spill over works in-between. Multiple arrays are placed at 1.5 ft from surface as compared to the 3 ft and reduced distance results in higher efficiency too, which is not accounted for in this simple example.

Looking back at FIG. 1a, it is apparent that the installation 10 moves at its lowest speed over the wings since the width of the platform and hence the number of arrays over the wings is smaller in comparison with the number of arrays that are installed on the vertical fin structure 261 and on the vertical fin extensions 262 which are the platforms covering the fuselage and the vertical fin.

Details on the placement of the nozzles are presented in more detail in FIG. 10. The same figure is used to explain two additional advantageous features/functions associated with the present disclosure.

The Proximity Units

FIG. 10 shows for simplicity only two arrays of nozzles 651 and 652, but it is understood that the width of the modules offers a platform capably to carry more arrays. The nozzle arrays may include different types of deicing nozzles for different types of frozen contamination, e.g., impulse jet for black ice, dispersing jet for frost, and the like. The first and the last arrays also generally include nozzles for dispensing anti-sticking fluids. On large airplanes, it is recommended to apply the anti-sticking with the array 652 while on rear-engine small airplanes array 651 is more suitable.

The arrays 651 and 652 shown in FIG. 10 are not installed directly on the modules, but on proximity units 301 that allow the deicing fluids to be dispensed from a substantially reduced distance as compared with nozzles attached directly to the structural contouring members 200, or to the modules 242.

Structural contouring members 200 are heavier and inherently slower, therefore larger clearances to the airplane would be needed to satisfy the collision concerns and larger clearances entail penalty in the deicing speed and usage of the deicing fluids.

The proximity units are of relatively small size, each one being positioned by its own actuators and hence, in assembly, the plurality of proximity structure 300 can more easily follow the contour of the airplane that translates in higher deicing speed and efficiency. This advantage of the small proximity units especially applies to cambered wings as shown in FIG. 4a.

The disclosed proximity units 301 minimize the consumption of deicing fluids and heat and mechanical energy without affecting security and the preferred embodiment provides for proximity structures.

The proximity units 301 are a light weight construction made of frangible materials that provide a base structure 302 on which nozzles are installed, as single nozzles or in clusters or in arrays.

Each proximity unit 301 in FIG. 10 carries on its base structure 302 single clusters 601, each cluster including impulse, dispersion and anti-sticking nozzles.

The nozzles are fed either by hoses (not shown) or thru piping integrated in their dual proximity actuators 304 shown of a linear type in FIG. 10.

The proximity structures 301-1 are slidably attached to the modules 242 by sliding means that are integrated with the dual proximity actuators 304 as shown in FIG. 10. FIG. 10 also shows proximity structures 301-2, 301-3 attached to the lower end of the vertical fin structure 261 and respectively to the vertical fin extension 262. FIG. 12 shows the proximity unit 301-3 provided also with a pivot 381 that allows that particular structure to rotate in a position appropriate for deicing the nose of the airplanes. Sliding and rotation are provided by dual proximity actuators 304.

Referring to FIG. 10, the extension of the dual proximity actuators 304 causes the base structure 302 to get closer to the deiced surface (upper wing surface in FIG. 10) while retraction causes the base structure to retract away from the deiced surface.

The dual proximity actuator includes one slow proximity actuator 304-S, of electric motor or compressed air or the like type, such that it moves with a controlled speed and it is provided with force or torque limiters that prevent damage if a collision with the deiced surface occurs.

The dual proximity actuator also includes one emergency retraction actuator 304-E, which is based on compressed air stored in a pressurized container 309 located on dual proximity actuator or air-bag technology or the like. The emergency retraction actuator is powerful enough to override eventual conflicting action from the slow proximity actuator.

On the base structure 302, proximity sensors 308 are attached in a number as required to provide a fail-safe system. The proximity sensors feed an independent proximity logic unit 307 located at the fixed end of the dual proximity actuators.

The proximity logic unit 307 controls the dual proximity actuators 304, such that, when enabled by a centralized controller of the deicing installation 10, the slow proximity actuator 304-S moves the base structure 302 to a predetermined distance from the surface to be deiced when the surface comes into a predetermined distance range from proximity sensors 308 and the slow proximity actuators 304-S retract the base structure from the deiced surface when proximity logic unit 307 is instructed by the centralized controller of the deicing installation or when the deiced surface exits the a pre-determined range from proximity sensors.

The emergency retraction actuator 304-E is activated as soon as the proximity logic unit 307, based on its programmed logic, and on the inputs from the proximity sensors 308, gives special control signal to retract when there is a collision potential.

While the proximity units 301 have been presented in conjunction with their particular installation on the lower side of the modules 242, the same principles apply for the inboard and outboard installation on the modules for deicing the side of the fuselage and the winglets, the inboard and the lower sides of the vertical fin structures 261 and vertical fin extensions 262 for deicing the top of the fuselage, the vertical fin and at least part of the horizontal stabilizer.

Proximity structures save deicing fluids and increase the deicing speed, but they add to the cost of the installation as well. Proximity structures are not necessary efficient for deicing small surfaces of the airplane as the winglets, the side of the fuselage that is deiced by the fluid flowing from the top.

The almost vertical arrays of nozzles 611 (see FIG. 10) installed on different sliding modules 242 are for deicing the winglets of the airplanes provided with deicing fluid. The first inner sliding module 242-i is provided with arrays of nozzles 621 for deicing the fuselage as shown in FIG. 11 (B737)

General Considerations about the Distribution of the Nozzles

Clean/fully deiced aircraft is the requirement and it is understood that some nozzles must be installed in some positions even if they are used only for one type of aircraft. The architecture of the disclosed installation provides a wide and flexible platform such that nozzles could cover the entire upper surface of any airplane intended to be deiced by the installation 10.

Deicing of the lower side of an aircraft is sometimes required, more specifically the lower surface (suction side) of the horizontal stabilizer. The installation disclosed herein is intended to work in conjunction with one or more self-guided vehicles that would spray the deicing fluid upside on the lower surface to be deiced two such vehicles 950 as shown in FIG. 2a, FIG. 3b, FIG. 4a and FIG. 5.

Shielding Device High deicing speed is made possible by the disclosed installation 10:
- by its contouring structure 100 that enables the simultaneous deicing large surface—the extensive way,
- by the proximity structure 300 formed totality of the independently controlled proximity units 301 that increase the speed by increasing the deicing efficiency—the efficiency way
- by the shield device disclosed hereinafter, that increases the deicing speed by the conservation of deicing fluids and their heats and mechanical energy—the conservation way.

As is true for deicing technologies in general, the installation disclosed by the present invention, the deicing trucks and the majority of previous attempts to build a higher speed airplane ground deicing installation use/used deicing fluid and, as required, anti-sticking fluids dispensed to the surface of the airplane.

Deicing fluids are generally heated and there are three effects that contribute to deicing: chemical (hereinafter it will be referred as "chemical", but it is rather a physical effect, just lowering the melting temperature of the frozen contamination by mixing it with a low freezing point fluid), thermal and mechanical.

The efficiency of the thermal and mechanical effects diminishes rapidly with the distance in between the dispensing nozzle to the surface to be deiced. The wind, a frequent factor on open spaces as runways, aggravates the losses and leads to loss of fluids as well.

Diminished deicing efficiency translates into longer deicing times, higher consumption of fluids, heat and pumping energy. Some designs propose to perform airplane deicing in partial enclosures, open ends, hangar-type constructions, but these never arrived to be widely used due to related disadvantages.

The proximity units 301 disclosed by the present invention reduce the distance from where the deicing fluids are dispensed and hence an increased efficiency and deicing speed.

Additionally, the shielding device disclosed by the present invention further increases the speed and efficiency of the deicing installation.

The shielding device maintains the chemical, thermal, and mechanical efficiencies of the deicing jets by creating an enclosure, or a partial enclosure, that maintains a saturated atmosphere and a higher temperature that reduce the thermal losses and fluid losses. The shielding device also prevents the deicing fluid being splashing away from the needed areas when impulse jets are used.

The shielding device is particularly efficient under wind, common on open spaces as runways; the shielding device prevents the convective heat loss and prevents the break of the impulse jets saving fluid and its mechanical energy.

An additional benefit provided by the shields is reducing the interference of the strong jets with the visualization devices and the ice detection and the proximity sensors used on the deicing installation 10.

Exemplary shielding device are shown in FIG. 10. A plurality of individual shielding devices 401 arranged in a particular way form a shielding system 400 that protects an entire area.

FIG. 10 shows the shielding device 401 provided on the nozzle clusters 601 installed on the proximity structure 301 that are attached through their proximity actuators 304 to the modules 242 which are structural contouring members, part of the contouring structure 100.

The shielding device includes a support structure 402 which in FIG. 10 is bolted to the base structure 302 of the proximity unit 301. The support structure 402 is provided with an opening for the nozzle cluster 601.

In FIG. 10, the support structure has two sides 403 extended with two appropriately angled surfaces 404 to which the two shielding pieces 405 are attached. The shield pieces are long such that they touch the surface of the airplane, and they are attached in a position and at an angle such that not to obstruct the jets of the deicing fluids.

The shielding pieces are generally made of rubber-like material of appropriate properties which is strong enough to withstand wind and soft enough such that they are safe for the airframe they touch. The preferred embodiment uses variable, decreasing, stiffness from their attached side towards the deiced surface.

The support structure is of a light weight, frangible construction as it works in the proximity of the surface of the airplane.

Note that in FIG. 10 the shield devices 401 protect only two sides of the deicing jets as being the most economical solution for that particular application where the deicing clusters 601 are arranged in arrays. It is understood that the shield device can be tailored for any particular location.

The front shielding devices are provided also with two shielding pieces, but one of the shielding pieces 406 is shorter to prevent wiping off the anti-sticking fluid that is dispensed from that location.

The proximity units 301 shown in FIG. 10 are smaller size and each carry just one cluster of nozzles. This is tailored to the particular situation where following the curved contour of the wing is required.

However, the shields are applicable to entire arrays of nozzles as for the ones used to deice the top of the fuselage on which straight structures are used. One such location is the lower side of the vertical fin structures 261 and vertical fin extension 262 that could be seen in the same FIG. 10.

FIG. 10 shows for simplicity only two rows of clusters of nozzles. However, in between the two rows several other rows could be installed as required by the prevailing type of frozen contamination on a particular airport.

FIG. 10 also show how the shielding devices 401 protect areas beyond their shielding pieces 405. Once a raw of shielding devices 405 touches the wing, the warm boundary layer WBL (FIG. 10) formed by hot fluid applied on the upper surface of the wing is protected and it will not be blown away by the wind. This improves both the fluid and energy usage but it increases the speed as well.

About the Piping

The deicing installation is provided with several fluid and electrical lines and installing these lines presents some challenges due to the flexibility of the architecture of the installation 10. Electric cables, hydraulic and pneumatic lines are less of challenge since they have a smaller cross section and they are therefore more flexible.

The deicing fluid and water lines have to accommodate a high mass flow, requiring large cross sections pipes that are more difficult to integrate with the high flexibility architecture of the deicing installation 10.

For the largest flow portions, different figures of the installation 10 show concentric, telescopic tubes, double vacuumed walls to prevent the loss of heat. This kind of construction allows the simultaneous transmission of two or three types of fluid on pipes that could be both extended and twisted in the same time. Piping and tubing are shown schematically in the following Figures: FIG. 3a (elements 801, 802 and 803), FIG. 8a (elements 802 and 803), and FIG. 10, which shows concentric telescopic pipes 803 provided at the ends with distributors 804 that transition to rigid manifolds 805, 806 laid along the over-wing beam to supply the deicing systems installed on the modules 242. The sliding modules 242 are supplied from the manifolds by flexible hoses 809, better shown in FIG. 8a.

The Mobility Units

Figure 17:
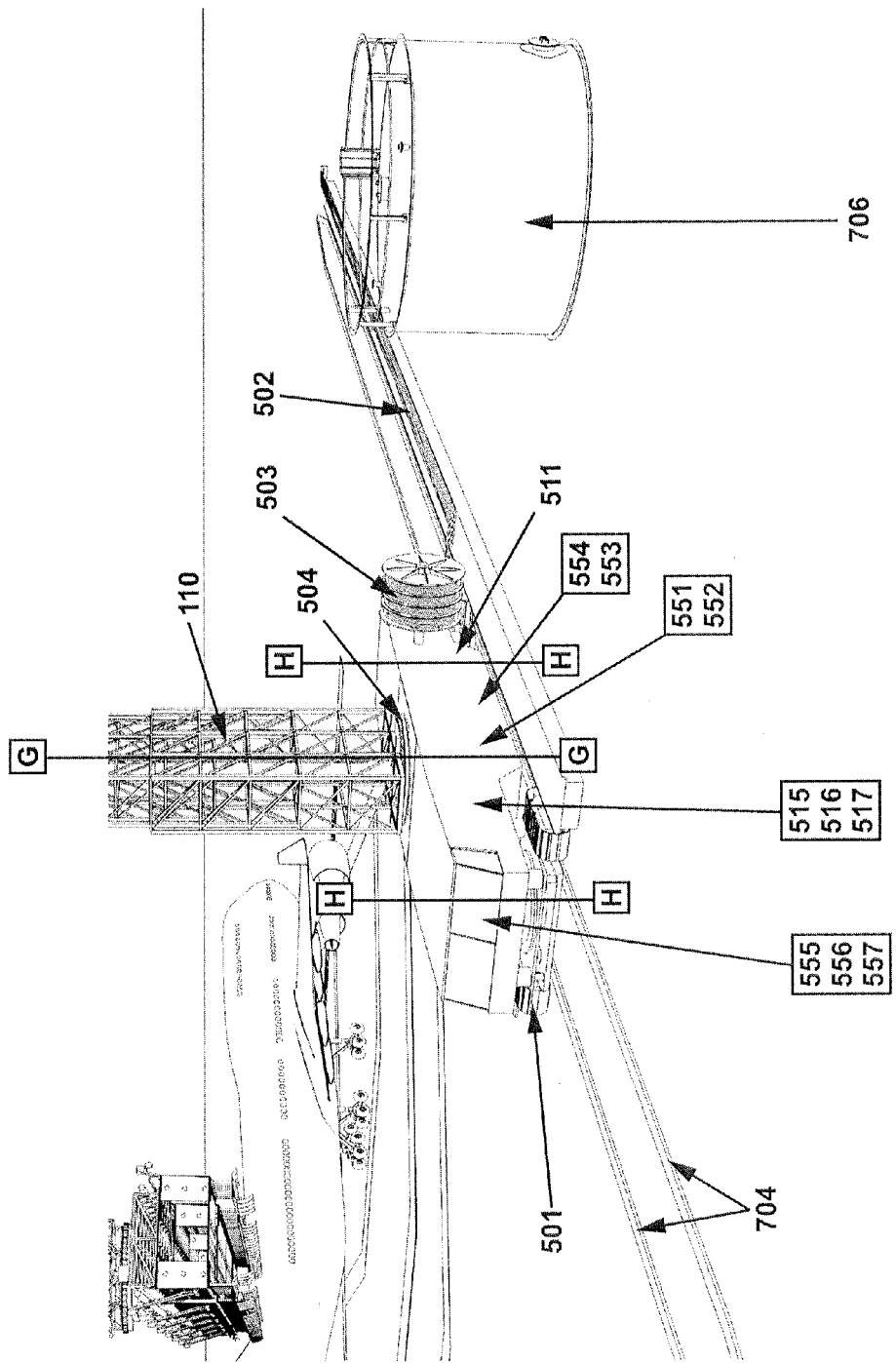
FIG. 17 is a rear side view of an exemplary deicing installation according to the present disclosure showing one of the mobility units and its associated subsystems.

FIG. 17 shows an exemplary mobility unit 500-, in particular the right mobility unit 500-R.

The primary role of the mobility units is to move the installation 10 along the airplane during deicing mode. However, the mobility units disclosed herein further distinguish themselves by the high mobility that enables the relatively large size deicing installation 10 to be relocated in a relatively short time while avoiding the obstacles usually found on airports: e.g., structures, signage and object free zones.

The cabin-like enclosures 510—built on top of the mobility units 500—accommodate the operators and systems of power, control and communications, liquid management. The systems that may be distributed in the two enclosures 510—include, not necessarily limited to:

- Combustion engines 511 to provide propulsion and the electric, hydraulic and pneumatic energy, as needed during relocation.
- Hydraulic power units 515 for driving the hydraulic actuators used on the deicing installation 10.
- Air compressor units 516 for driving the pneumatic actuators used on the deicing installation 10 and for purging the deicing and the anti-icing fluids and the water for the pipes. Preferred embodiment provides also for dispensing the anti-sticking fluid by compressed air. The anti-sticking are non-Newtonian fluids and they include long molecules that could be broken by aggressive pumping or by treacherous piping provided with unsuitable valves, etc.
- Electrical invertors 517 driving the electrical motors controlling the configuration of the de-icing installation 10.
- De-icing fluid buffer tanks 552 that allow the external supply hoses 502 connecting to fixed supply pipes to be of smaller size than the one that would be needed to supply the flow at its peak demand, when spraying on the wings. The buffer tanks are generally heated.
- Deicing fluid storage tanks 551 optional for the airports opting for using tanker-truck to supply the fluids instead of fixed supply pipes. Storage tanks are normally larger than the buffer tanks 552.
- Pumps 553 for the deicing, water and for the anti-sticking fluids.
- Heating systems 554 for the deicing fluids in the buffer tanks 552 and/or for in-line fine tuning.
- Configuration and operation control computers 555, recorders of the ice detection sensors output (black box) 556.
- Communication with ground control, with the flight crews and with the deicing operating company 557.

During the deicing mode, a preferred embodiment of the present disclosure provides for electrical power supplied from the ground based on cost/ecologic considerations.

Each mobility unit is supported by two steerable rolling units 570. The mobility units 500—are of elongated shape and the rolling units are placed close to the ends of the mobility units for stability reasons. The mobility units 500—will be operated most of the time at essentially perpendicular position in respect to the horizontal structural beam 102, except for some maneuvers required during relocation. Note that during the relocation the horizontal structural beam 102 (not shown in FIG. 17) is at its lowest height and the over-wing beams 240 are secured parallel to the horizontal structural beam 102.

Each rolling unit 570 is provided with opposite crawlers or wheels 501 (tracks shown). While rubber type wheels are a valid option, the preferred embodiment provides for crawlers since crawlers' lower ground pressure allows relocation routes involving unpaved ground such as to minimize the impact on airport's operations.

The pair of crawlers or wheels on the rolling units will be called herein after twins. The rolling units 570 could rotate around their vertical centerline H-H+/−180° plus margin.

For installations riding on steel rails during deicing, the bearing 504 (see FIG. 18) is blocked and the mobility units 500—cannot rotate around their G-G centerline and they move in a synchronized along the rails 704.

For preferred embodiments, which includes installation 10 riding on tarmac during deicing, the bearing 504 is never blocked and the mobility units 500—could rotate against the vertical centerline+/−90° plus margin.

The steerable units are also provided with active suspension that compensate for uneven terrain as shown in FIG. 2b.

Irrespective of whether the installation 10 rides on steel rails or on tarmac, all freedom degrees are coordinated by the position of the installation.

Figure 18:
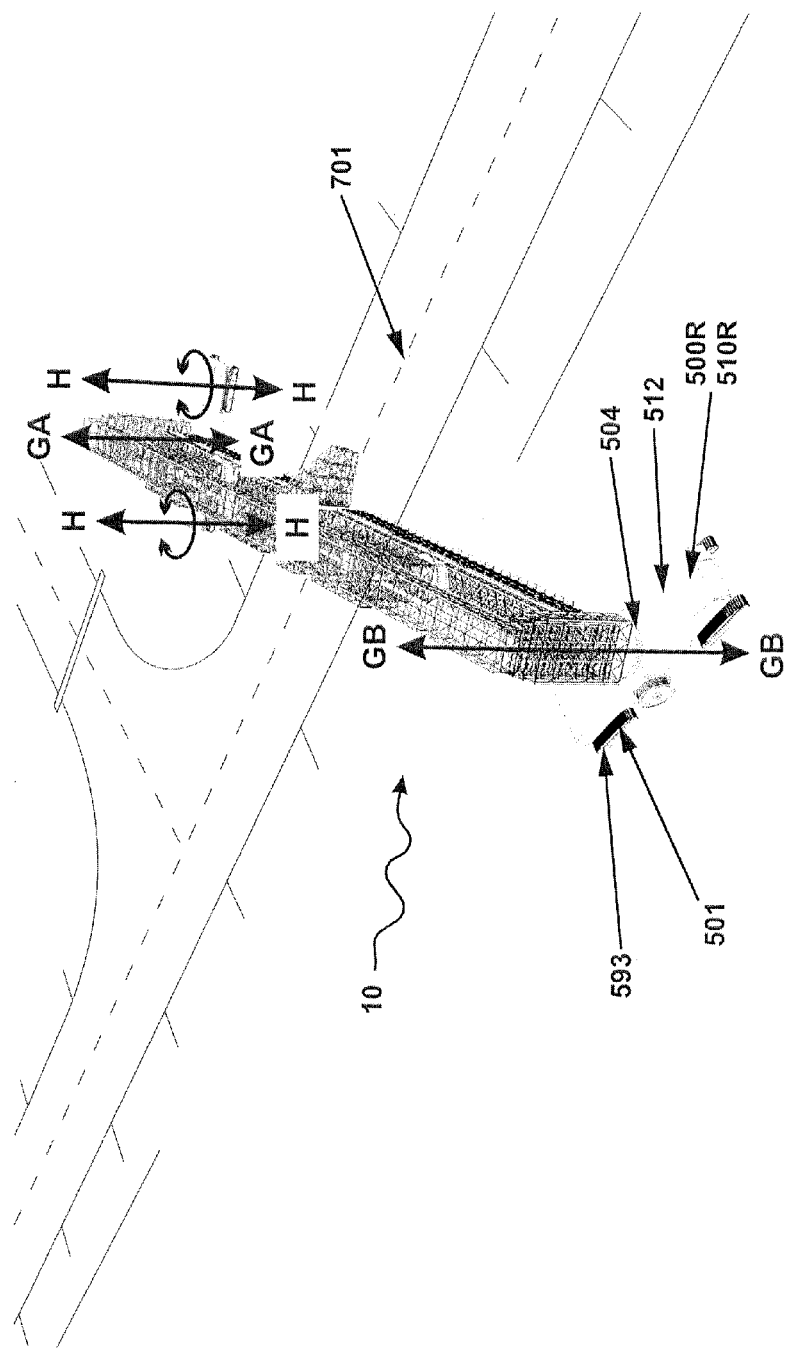
FIG. 18 is a top perspective view of an exemplary deicing installation according to the present disclosure showing the deicing installation in relocation mode, freeing the taxiway by rotating around one the fixed mobility units.
Figure 19:
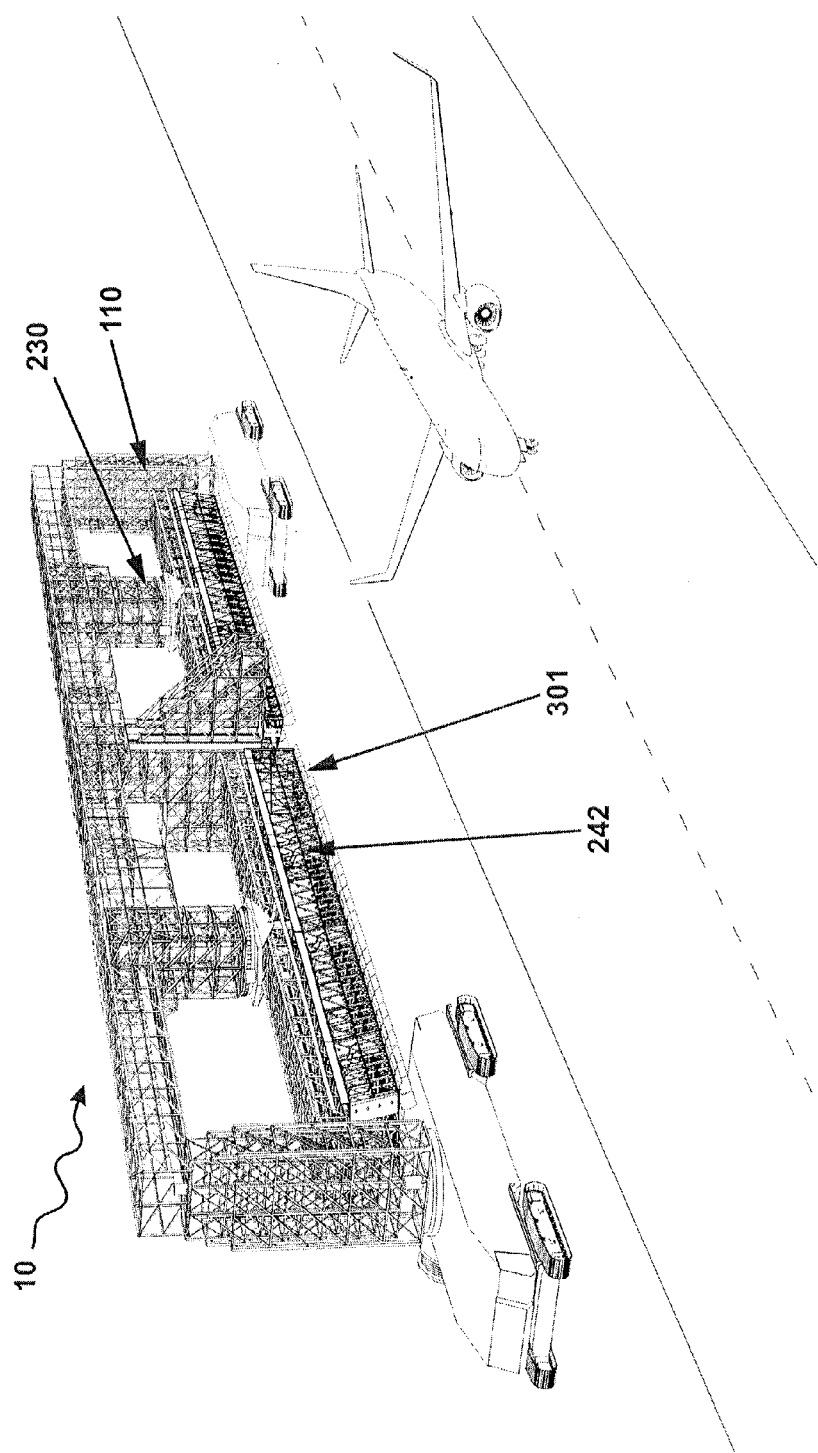
FIG. 19 is a front perspective view of an exemplary deicing installation according to the present disclosure showing the deicing installation in relocation mode after it has cleared the taxiway.

In a preferred embodiment, the motorized crawlers 501 shown in FIG. 18 are driven by electric motors 593 (see also FIG. 2b) supplied by invertors/controllers 512. In a preferred embodiment, installation 10 riding on tarmac in the deicing mode, the motor, the transmission and the steering are used for both deicing and relocation.

In the embodiment where the installation 10 rides on steel track during deicing, the steel wheels 590 shown in FIG. 2b need dedicated motors.

The electric system is easier to control in both modes deicing and relocation mode and it is easier to integrate with the steering in the relocation mode.

The disclosed configuration of the mobility units enables many different types of maneuvering as shown in the FIGS. 18-22 and described herein below. To name just a few: rotation against one vertical pole, rotating against the central of the installation or against any axis, moving perpendicular or in line or at any angle in respect to the horizontal beam, or practically any combination of translation-rotation. Additionally, the mobility units could be set at any angle from parallel to perpendicular to the horizontal structural beam as required by the available route.

The multiple degree of freedom of the disclosed mobility units 500—require a controlled or assisted steering. Even so, a safety feature that protects the structural integrity of the installation 10 is still recommended—telemetry information fed to the steering computer ensures that the distance between the two vertical poles bearing means 504 (see FIG. 3a and FIG. 18) remains constant irrespective to the type of maneuvering.

Many of the signage on an airport are low profile, and it is therefore recommended that relocation is planned in advance and routes controlled by a high-precision GPS system according to the airport's GPS map.

The Operation of the Installation in the Deicing Mode.

While installation riding on steel rails is not the preferred embodiment, the operation of the installation will be first explained for this configuration because it is more complex.

During deicing operation mode, the mobility units 500—move the installation 10 (FIG. 4a) from the front to the rear of the airplane being deiced at a speed synchronized with the position of the contouring structure 100 and proximity structure 300 as controlled by the telemetry and proximity sensors. The general deicing speed is controlled by feedback from the ice-detection sensors measuring the thickness of the snow/ice and those sensors assessing the completion of the de-icing. Note that if the deicing on a surface is not complete, the deicing installation 10 reverses its direction and deice again that surface.

With general reference to FIG. 2a, the following description of an exemplary operation of the disclosed deicing installation 10 is provided.

Cycle Start.

The deicing cycle starts from the home position 901 located at a safe distance beyond the "Stop here for deicing" line 709. The mobility units 500—bring the installation with the horizontal beam structure above the line 901.

Pre-Contouring.

In order to save time, pre-contouring for the next type of airplane in line for deicing, is generally performed while the installation 10 gets back to its home position 901 (FIG. 2*a*) and it could continue as needed while the next airplane taxies to the deicing location.

Pre-contouring means that the contouring structures 100 (shown in FIG. 4*a*) is already in the position corresponding to the next airplane in line as that airplane would be ideally positioned (on centerline and no crabbing) plus safety distances to the theoretical contour of the airframe. The proximity structure 300 is retracted at this point.

The pre-contouring parameters include all freedom degrees No. 1 to No. 8 shown in FIG. 4*b*.

The installation is initially set for the height of the fuselage: Freedom degree No. 1 and the freedom degree No. 3 (the position of the vertical fin extension) and in the meantime it is set for the width of the fuselage together with height and position of the wing and of the winglets. This involves freedom degree No. 4 of the downward vertical structure 230, the Swept As and dihedral Ad angles, respectively, freedom degrees No. 6 and No. 7 (see FIGS. 5 and 6) and the position of the sliding modules 242 (freedom degree No. 8) that provides the clearance for winglets (CW) (see FIG. 6 and FIG. 11).

The vertical fin structures 261 are initially positioned (freedom degree No. 2-L and 2-R) for deicing the nose of the airplane.

Position Airplane.

The airplane rolls and stops to the best ability of the pilots on the centerline with the nose of the airplane aligned to line 709 (FIG. 2*a*).

Telemetry sensors (not shown) on the deicing installation acquire real airplane position data, its distance to the line 709, the position of the nose and of the vertical fin in respect to the centerline of the taxiway 701, the actual height at the tip of the tail and at both tips of the wings.

Reduce Clearances.

Based on the precise information above, the mobility structure is moved to new positions with reduced clearances to the airframe.

First Proximity.

The deicing installation 10 starts moving toward the airplane and stops in the nose deicing position. The proximity structure deploys 301-3 (FIG. 12) and sends a signal to deice. The deicing starts and stops when the ice detection sensors send a signal "nose deicing complete".

Deicing Fuselage.

Upon the retraction of the proximity structures 301-3, the deicing installation 10 starts to roll towards the tail of the airplane while spraying deicing fluid and dispensing anti-sticking fluid from the nozzles installed on the proximity structures 301-2, 301-3, 301-4 (FIG. 12) installed on the lower side of the vertical fin structures 261 and on vertical fin extensions 262.

The side of the fuselage is deiced by nozzles 621 (FIG. 11) installed on the inner side of the inner modules 242-*i*

The rolling speed of the installation is controlled by the ice detection sensors (not shown). Spraying could be stopped from time to time as needed to assess the quality of the deicing if the information from the ice detection sensors is biased by the sprayed fluid.

Deicing the Wings.

Deicing the fuselage continues as described above while deicing the wings as shown in FIGS. 13 and 14.

While the modules 242 gets above the wings, the proximity structures 301 (FIG. 10) are lowered to the predetermined proximity to the wings. The proximity structures are independent, smaller units and therefore they could follow the contour of the wing even for cambered wings. Speed is controlled by ice detection sensors and it is expected that speed to be slower as already explained.

Deicing the fuselage continues uninterrupted after deicing the wings.

Deicing the Vertical Fin.

The height of the horizontal structural beam 102 is adjusted. Freedom degree No. 1 by the poles 110 to the fin height plus safety clearance at some safety distance before reaching the fin. The vertical fin is deiced by the deicing systems 680 installed on the inboard side of the vertical fin structure 261 and vertical fin extension 262 show in FIG. 15.

For T tail, high mounted horizontal stabilizers (FIG. 16), the deicing installation stops rolling at a safe distance before the vertical fin extensions 262 reach the stabilizer to allow time for deicing the vertical fin by the deicing systems 680 installed on the inboard of the vertical fin extension structure 262. The deicing installation continues to roll after the vertical find extension structure 262 is raised (freedom degree No. 3) at a height to clear the horizontal stabilizer.

Deicing the Horizontal Stabilizer.

The inboard portion of the horizontal stabilizers are deiced by the proximity structures 301-3 shown in FIG. 12 installed on the lower side of the vertical fin extensions 262. The horizontal stabilizers of the small airplanes including T tails are deiced entirely by the nozzles installed on the proximity units 301-2 and 301-3.

Before the modules 242 reach the stabilizer their height is adjusted for deicing the outer portion of the stabilizers. This is done by the proximity modules 301-1 installed on the first inboard modules 242-*i* (FIG. 7).

Deicing Completed.

When deicing is completed the deicing installation 10 will notify the pilots that the airplane is clear to leave the deicing pad—signal panels, or radio or both.

Return to the Home Position.

Sensors installed on the deicing installation 10 will control the motion during the return to the home position 901 (FIG. 2*a*) While speed is of essence, the installation keeps a safe distance behind the deiced airplane. While returning to the home position 901, the contorting structures 100 will start to move to the pre-contouring configuration corresponding to the next airplane in line.

Automatically remotely controlled vehicles are indicated as a potential means to perform deicing of the lower side of the airplane. When this is required, it is especially for the lower side of the horizontal stabilizers. (see FIG. 2*a*, FIG. 3*b*, FIG. 4*a* and FIG. 5) show such vehicles 950.

The Operation of the Installation During Relocation Mode.

Moving large and heavy pieces of equipment on an airport is a challenge due to the strict safety regulations, due to the cost of each disruption of airport's operations and to the fact that taxiways and runways are surrounded by numerous airport-specific signs and lighting. Therefore, moving the deicing installation 10 over unpaved ground is desirable and hence the preferred embodiment provides for crawlers.

There are four basic relocation-related requirements: ground pressure appropriate for unpaved ground, maximum mobility, self-propelled and computer/GPS control as required by its multiple degrees of freedom.

FIG. 18 to FIG. 22 illustrate the operation of the installation during the relocation mode.

For all practical reasons, before starting any relocation procedure, the deicing installation 10 is brought to the lowest height by lowering the poles 110 to their minimum height and lowering the downward vertical structures 230 to the lowest position that allows the rotation of the mobility units 500—without interfering with the modules 242 and the proximity units 301.

Also advisable: locking the over-wing beams 240 among themselves and to the vertical poles 110 and allowing a slight mobility in between the vertical poles and the horizontal structural beam. This position is better seen in FIG. 19.

FIG. 18 shows the deicing installation 10 after it leaves the deicing area moving to the left of the picture and turning counterclockwise in order to clear the taxiway 701.

In sequence, the bearing 504 is unlocked, the inner and outer (inner/outer is meant in respect to the centerline Gb-Gb) twin trucks 501 of each crawler unit 570 of the mobility unit 500-L are rotated in an opposite directions until the rolling units 570 turn around their H-H axis to positions that would be tangent to a circle centered on the axis Gb-Gb. Then, mobility unit 500-L starts moving the deicing installation 10 in the counterclockwise direction CCW, the speeds of the twin crawlers 501 being proportional to the radii to the Gb-Gb axis until the installation turn the full 90 degrees (FIG. 19) or whatever angle is necessary.

Figure 20:
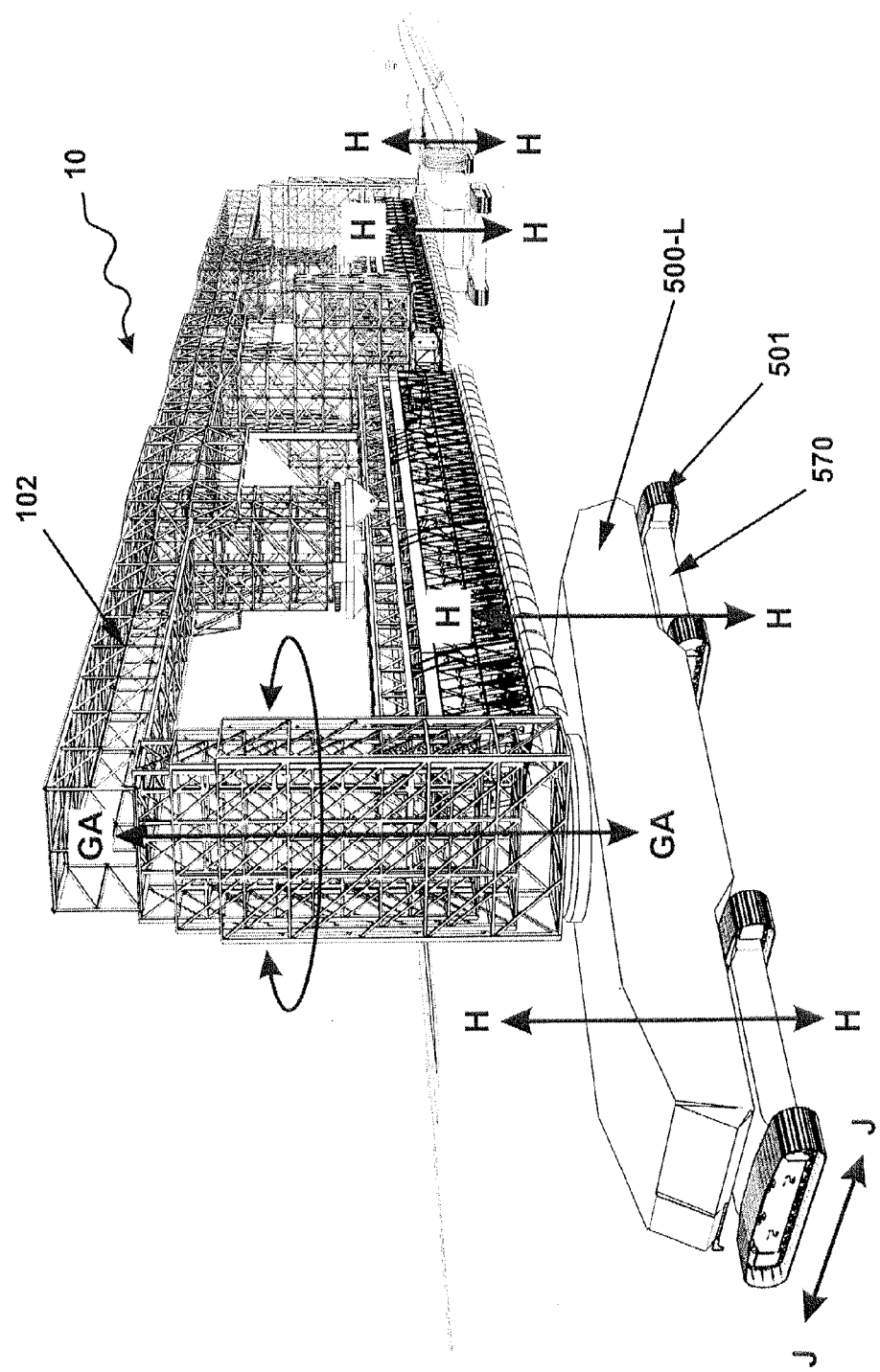
FIG. 20 is a front perspective view of an exemplary deicing installation according to the present disclosure showing the deicing installation in relocation mode as one of the mobility units rotates around its axis to become parallel to the horizontal beam structure and to the other mobility unit.

FIG. 20 shows how the mobility unit 500-L is reoriented to become parallel to the horizontal structural beam 102. In sequence: after the deicing installation 10 rotates 90 degrees (FIG. 18), the twin crawlers 501 of the each rolling unit 570 start rotating in opposite directions until the rolling units 570 rotate 90 degrees around their centerlines H-H. Once in this position, the twin crawlers 501 of each rolling unit 570 start to move in the same direction with a speed proportional to the radii from the centerline Ga-Ga, but the twin crawlers 501 of the two rolling units 570 move in opposite direction such that the mobility unit 500-L rotates around its centerline Ga-Ga until it become parallel to the horizontal structural beam 102.

Figure 21:
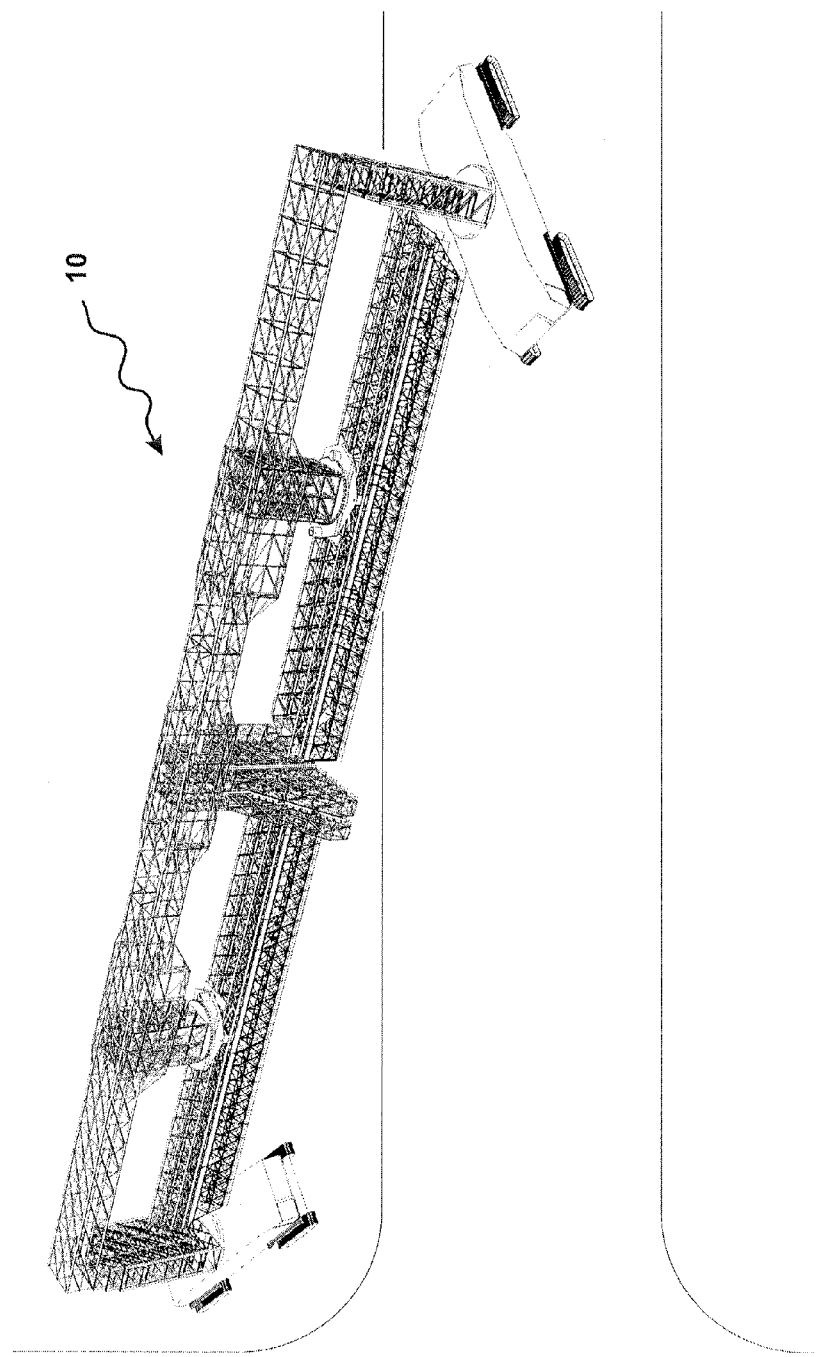
FIGS. 21 and 22 are top views of an exemplary deicing installation according to the present disclosure showing the deicing installation in relocation mode during complex turning maneuvers involving both turning and translation (FIG. 21) and moving rectilinearly in the direction of its horizontal beam structure while having one of its mobility unit perpendicular and the other parallel to the horizontal beam structure (FIG. 22).
Figure 22:
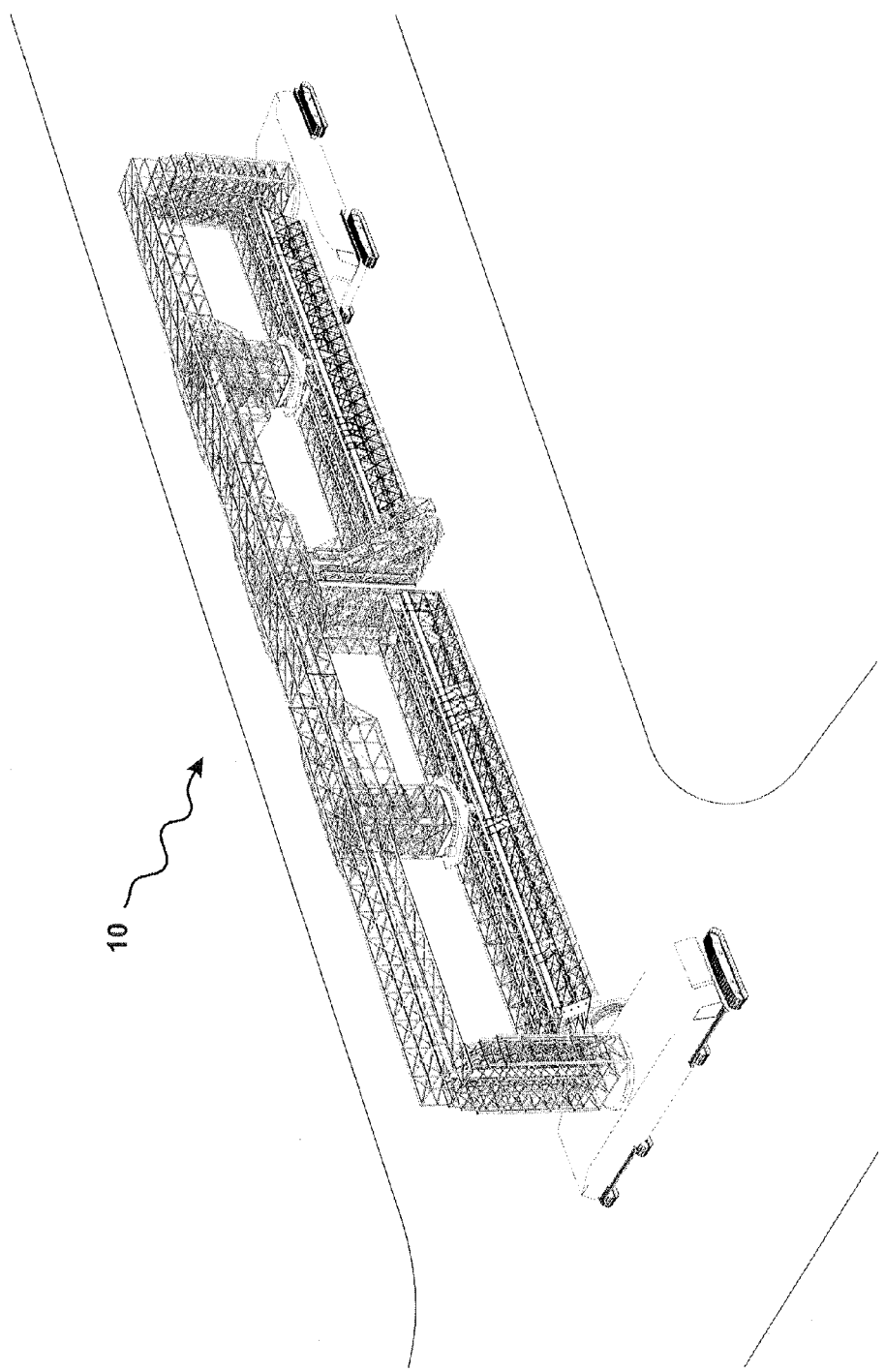

FIG. 21 shows that practically any maneuver possible, while FIG. 22 shows the installation moving on clear ground.

FIGS. 18-22 show only some maneuvering possibilities offered by the mobility-related architecture of the deicing installation 10. The same figures also demonstrate that steering is ideally computerized and it is highly recommended that for each airport the relocation routes from one runway to another and to the parking pad need to be pre-defined and pre-programmed to be controlled by GPS.

Since a de-synchronization in between the mobility units 500—(even if steering is computerized) could put a large load on the horizontal beam 102, and on its junctions with the vertical poles 110, one control system based on a telemeter is recommended.

Alternative Embodiments

It is understood that many versions of deicing installations could be produced starting from the general principles and systems disclosed by the present invention. The most obvious would be the simplified versions. Numerous simplified versions can be produced stating from the preferred embodiment and it is just a matter of needs-price-performance analysis and preferences.

Some airports absolutely need the highest speed and accommodate the largest airplanes while some others, for a lower acquisition cost, would easily accept a longer deicing time, while maintaining efficiency. Some others would accept even lower efficiencies.

Some airports would prefer a relocatable installation while some others would prefer two installations as those major airports having only two runways.

Some simplified versions of the disclosed embodiments include:

a) An installation like the disclosed installations, but with the freedom degree No. 6 suspended. This configuration could achieve almost the same level of efficiency, but at a lower speed since swept wings will be deiced progressively and not massively as could be inferred for example from FIG. 2*f*.

b) An installation like a) but without the freedom degree No. 7; the angle of the over-wing beam 242 being in this case fixed at an average dihedral angle which would give an acceptable compromise to most types of the airplanes.

Related to the angular adjusting unit, it is also understood that, if an angular adjusting unit is provided, this could be installed in a different position like at the top of downward vertical structures 230, or even it could be split into two pieces, one adjusting the angle Ad, the other adjusting the angle As without departing from the functions defined by the present invention.

c) Another derivative would be to cancel the freedom degree No. 1, i.e., the adjustable height capability This would be acceptable for some airports with a limited number of types of aircrafts.

d) Cancel the freedom degree No. 2; vertical fin structures attached in a fixed position on the horizontal structural beam is a simpler, lighter and less expensive construction, and it will work better for the embodiments of installation 10 riding on tarmac. However, clearances need to be increased substantially in the case of installation 10 riding on mental rails since off-centerline and/or crabbing airplanes need to be accommodated.

e) Cancel the freedom degree No. 4, the lateral inboard-outboard mobility of the downward vertical structures. This could be achieved with some loss of speed and without substantial loss of efficiency. Different fuselage sizes are to be accommodated by freedom degree No. 6 (swept angle).

f) An installation as the preferred embodiment 10 but without the proximity structure 300. In such alternative embodiment, the nozzles and the proximity and ice detection sensors will be installed directly on the structural contouring members 200. Acquisition cost will be lower but the efficiency will be lower too.

Thus, as is apparent from the discussion set forth above, the present invention is susceptible to many modifications, revisions, refinements and enhancements, without departing from the scope or spirit of the present disclosure. Accordingly, the present disclosure expressly encompasses all such modifications, revisions, refinements and enhancements as will be readily apparent to persons skilled in the art, based on the detailed description provided herein.

The invention claimed is:

1. A system for deicing a plurality of airplanes having differing outer configurations, the system comprising:
   a. first and second mobility units adapted for independent movement relative to an airplane positioned for deicing treatment;
   b. first and second vertical elements extending upward relative to the first and second mobility units, respectively;
   c. a horizontal beam structure extending between the first and second and vertical elements;
   d. a plurality of downwardly extending vertical structures that are mounted with respect to the horizontal beam structure between the first and second vertical elements;
   e. at least one proximity structure mounted with respect to each of the plurality of downwardly extending vertical structures; and f. a plurality of nozzles deploying deicing fluid mounted with respect to each of the proximity structures;

wherein the at least one proximity structure includes first and second proximity structures, and wherein the first and second proximity structures include a degree of freedom whereby the relative positioning of the first and second proximity structures is adjusted based upon the outer configuration of the airplane.

2. The system according to claim 1, wherein the first and second mobility units include a degree of freedom whereby the relative positioning of the first and second proximity structures is adjusted based on the positioning of the airplane for deicing.

3. The system according to claim 1, wherein the first and second mobility units are adapted to travel on a rail.

4. The system according to claim 1, wherein the first and second mobility units include elements that permit travel on a tarmac.

5. The system according to claim 1, wherein the first and second vertical elements include a degree of freedom whereby the relative positioning of the first and second proximity structures is adjusted based on at least one of (i) the outer configuration of the airplane, and (ii) the relative positioning of the first and second mobility units relative to the longitudinal axis of the airplane.

6. The system according to claim 1, wherein the plurality of downwardly extending vertical structures include a degree of freedom whereby the relative positioning of the first and second proximity structures is adjusted based on at least one of (i) the outer configuration of the airplane, and (ii) the relative positioning of the first and second mobility units relative to the longitudinal axis of the airplane.

7. The system according to claim 1, wherein the at least one proximity structure includes the plurality of nozzles arranged in an array.

8. The system according to claim 1, wherein the at least one proximity structure includes a shielding devices that function to control dissipation of deicing fluid delivered from the plurality of nozzles.

9. The system according to claim 8, wherein the shielding devices extend downward and contact the surface of the airplane during deicing operations.

10. The system according to claim 1, wherein the first and second proximity structures each include a contouring structure, and wherein the contouring structures provide a platform for mounting of the plurality of nozzles.

11. The system according to claim 10, wherein the contouring structures are mechanically interconnected and wherein the relative positions of the interconnected contouring structures is adjustable based on at least one of (i) the outer configuration of the airplane, and (ii) the relative positioning of the first and second mobility units relative to the longitudinal axis of the airplane.

12. The system according to claim 1, further comprising actuators for controlling relative movement of (i) the first and second vertical elements; (ii) the plurality of downwardly extending vertical structures, and (iii) the proximity structures.

13. The system according to claim 1, further comprising first and second vertical fin structures mounted with respect to the horizontal beam structure.

14. The system according to claim 13, wherein the first and second vertical fin structures include a degree of freedom that is adjustable based on at least one of (i) the outer configuration of the airplane, and (ii) the relative positioning of the first and second mobility units relative to the longitudinal axis of the airplane.

15. The system according to claim 13, wherein the first and second vertical fin structures include vertical fin extensions that are controlled by actuators that adjust positioning based on at least one of (i) the outer configuration of the airplane, and (ii) the relative positioning of the first and second mobility units relative to the longitudinal axis of the airplane.

16. A method for deicing a plurality of airplanes having differing outer configurations, the method comprising:
 a. providing a deicing installation that includes (i) first and second mobility units adapted for independent movement relative to an airplane positioned for deicing treatment; (ii) first and second vertical elements extending upward relative to the first and second mobility units, respectively; (iii) a horizontal beam structure extending between the first and second and vertical elements; (iv) a plurality of downwardly extending vertical structures that are mounted with respect to the horizontal beam structure between the first and second vertical elements; (v) at least one proximity structure mounted with respect to each of the plurality of downwardly extending vertical structures; and (vi) a plurality of nozzles mounted with respect to each of the proximity structures;
 b. positioning a first airplane characterized by a first outer configuration in proximity to the deicing installation; and
 c. advancing the first and second mobility units longitudinally relative to the first airplane; and
 d. delivering deicing fluid to the surface of the first airplane from the plurality of nozzles,
 wherein the at least one proximity structure includes first and second proximity structures, and wherein the first and second proximity structures include a degree of freedom whereby the relative positioning of the first and second proximity structures is adjusted based upon the outer configuration of the first airplane.

17. The method of claim 16, wherein the first and second mobility units are repositioned so as to accommodate the positioning of the first airplane relative to a centerline defined on the tarmac.

18. The method of claim 16, further comprising returning the first and second mobility units to an initial position at the conclusion of the deicing operation.

19. The method of claim 18, further comprising repeating the recited steps with respect to a second airplane characterized by a second outer configuration that is different than the first outer configuration that is positioned in proximity to the deicing installation.

20. The method of claim 16, further comprising repositioning the deicing installation by navigating a travel route with the first and second mobility units.

* * * * *